US010667528B2

(12) United States Patent
Torres et al.

(10) Patent No.: US 10,667,528 B2
(45) Date of Patent: Jun. 2, 2020

(54) PROCESSING OBJECTS BY RADIO FREQUENCY (RF) ENERGY

(71) Applicant: GOJI LIMITED, Hamilton (BM)

(72) Inventors: Eyal Torres, Savyon (IL); Daniel Selinger, Tel-Aviv (IL)

(73) Assignee: GOJI LIMITED, Hamilton (BM)

( * ) Notice: Subject to any disclaimer, the term of this patent is extended or adjusted under 35 U.S.C. 154(b) by 0 days.

(21) Appl. No.: 14/964,246

(22) Filed: Dec. 9, 2015

(65) Prior Publication Data

US 2016/0088689 A1    Mar. 24, 2016

Related U.S. Application Data

(62) Division of application No. 13/805,958, filed as application No. PCT/IB2011/001981 on Jun. 30, 2011, now Pat. No. 9,265,097.

(60) Provisional application No. 61/360,532, filed on Jul. 1, 2010.

(51) Int. Cl.
*H05B 6/68* (2006.01)
*H05B 6/70* (2006.01)
*A21D 8/06* (2006.01)

(52) U.S. Cl.
CPC .......... *A21D 8/06* (2013.01); *H05B 6/68* (2013.01); *H05B 6/687* (2013.01); *H05B 6/688* (2013.01); *H05B 6/705* (2013.01); *Y02B 40/143* (2013.01)

(58) Field of Classification Search
USPC .................................................. 219/745–755
See application file for complete search history.

(56) References Cited

U.S. PATENT DOCUMENTS

| 4,210,795 A | * | 7/1980 | Lentz | H05B 6/6432 219/703 |
|---|---|---|---|---|
| 4,317,977 A | | 3/1982 | Buck | |
| 4,323,746 A | * | 4/1982 | Gerling | H05B 6/76 219/697 |
| 4,334,136 A | * | 6/1982 | Mahan | D06F 58/04 219/681 |
| 4,434,342 A | | 2/1984 | Schubring | |
| 4,441,002 A | | 4/1984 | Teich | |
| 4,447,693 A | | 5/1984 | Buck | |

(Continued)

FOREIGN PATENT DOCUMENTS

| DE | 19718399 A1 | 11/1998 |
|---|---|---|
| DE | 102007003225 A1 | 7/2008 |

(Continued)

OTHER PUBLICATIONS

Extended European Search Report dated Nov. 24, 2015 in related European Application No. 15175210.2, 12 pages.

(Continued)

*Primary Examiner* — Ibrahime A Abraham
*Assistant Examiner* — Gyounghyun Bae
(74) *Attorney, Agent, or Firm* — Greenblum & Bernstein, P.L.C.

(57) ABSTRACT

A method of processing an object is disclosed. The method comprises heating the object by applying radio frequency (RF) energy, monitoring a value related to a rate of absorption of RF energy by the object during the heating, and adjusting the RF energy in accordance with changes in a time derivative of the monitored value.

11 Claims, 11 Drawing Sheets

(56) References Cited

U.S. PATENT DOCUMENTS

| | | | |
|---|---|---|---|
| 4,458,126 A * | 7/1984 | Dills | H05B 6/72 |
| | | | 219/748 |
| 4,541,729 A | 9/1985 | Schubring | |
| 4,647,746 A | 3/1987 | Eke | |
| 4,751,511 A * | 6/1988 | Komata | G01S 13/58 |
| | | | 342/59 |
| 4,777,336 A * | 10/1988 | Asmussen | G01R 27/2635 |
| | | | 219/696 |
| 4,794,219 A | 12/1988 | Eke | |
| 4,795,871 A * | 1/1989 | Strattan | D06F 58/266 |
| | | | 219/707 |
| 4,841,111 A | 6/1989 | Kokkeler et al. | |
| 5,008,506 A * | 4/1991 | Asmussen | H05B 6/52 |
| | | | 219/696 |
| 5,274,209 A | 12/1993 | Edamura | |
| 5,360,965 A | 11/1994 | Ishii | |
| 5,695,672 A | 12/1997 | Kim | |
| 5,893,051 A | 4/1999 | Tomohiro | |
| 5,945,018 A | 8/1999 | Halen | |
| 6,067,475 A | 5/2000 | Graves | |
| 6,097,019 A | 8/2000 | Lewis et al. | |
| 6,299,921 B1 | 10/2001 | Loffler et al. | |
| 6,486,453 B1 | 11/2002 | Bales | |
| 6,867,402 B1 | 3/2005 | Schulte | |
| 6,884,979 B1 * | 4/2005 | Torngren | H05B 6/686 |
| | | | 219/697 |
| 6,963,301 B2 * | 11/2005 | Schantz | G01S 5/14 |
| | | | 342/118 |
| 7,030,600 B2 | 4/2006 | Adlerstein et al. | |
| 7,167,008 B2 | 1/2007 | Tsuji | |
| 8,839,527 B2 | 9/2014 | Ben-Shmuel et al. | |
| 8,901,470 B2 * | 12/2014 | Oomori | H01L 21/67115 |
| | | | 219/702 |
| 8,927,913 B2 * | 1/2015 | Hyde | H05B 6/705 |
| | | | 219/702 |
| 9,035,821 B2 * | 5/2015 | Feil | G01S 13/422 |
| | | | 342/113 |
| 9,992,824 B2 | 6/2018 | Rogers | |
| 2002/0160717 A1 * | 10/2002 | Persson | G01R 29/0821 |
| | | | 455/67.11 |
| 2002/0162836 A1 * | 11/2002 | Taino | H05B 6/6402 |
| | | | 219/710 |
| 2005/0001169 A1 * | 1/2005 | Happel | G01F 1/663 |
| | | | 250/356.1 |
| 2006/0052067 A1 * | 3/2006 | Singh | H04W 76/40 |
| | | | 455/108 |
| 2006/0081624 A1 * | 4/2006 | Takada | H01J 37/32192 |
| | | | 219/716 |
| 2008/0193614 A1 | 8/2008 | Greiner et al. | |
| 2008/0290087 A1 | 11/2008 | Ben-Shmuel et al. | |
| 2009/0057302 A1 * | 3/2009 | Ben-Shmuel | H05B 6/72 |
| | | | 219/748 |
| 2009/0061070 A1 | 3/2009 | Greiner et al. | |
| 2009/0236333 A1 | 9/2009 | Ben-Shmuel et al. | |
| 2009/0236334 A1 | 9/2009 | Ben-Shmuel et al. | |
| 2009/0274805 A1 | 11/2009 | Schonemann | |
| 2010/0006564 A1 | 1/2010 | Ben-Shmuel et al. | |
| 2010/0187224 A1 | 7/2010 | Hyde | |
| 2010/0243645 A1 * | 9/2010 | Ishizaki | H05B 6/686 |
| | | | 219/702 |
| 2010/0252551 A1 * | 10/2010 | Nordh | H05B 6/74 |
| | | | 219/702 |
| 2011/0031236 A1 | 2/2011 | Ben-Shmuel | |
| 2011/0110410 A1 * | 5/2011 | Leiba | H04L 1/0003 |
| | | | 375/224 |
| 2012/0067872 A1 * | 3/2012 | Libman | H05B 6/647 |
| | | | 219/702 |
| 2012/0111856 A1 | 5/2012 | Nobue et al. | |
| 2012/0182174 A1 * | 7/2012 | Feil | G01S 13/422 |
| | | | 342/113 |
| 2012/0312801 A1 * | 12/2012 | Bilchinsky | H05B 6/705 |
| | | | 219/438 |
| 2013/0080098 A1 | 3/2013 | Hadad et al. | |
| 2013/0200065 A1 | 8/2013 | Libman et al. | |
| 2013/0200066 A1 | 8/2013 | Gelbart et al. | |
| 2013/0306627 A1 | 11/2013 | Libman et al. | |
| 2014/0247060 A1 | 9/2014 | Ben Haim et al. | |
| 2014/0287100 A1 | 9/2014 | Libman | |
| 2014/0345152 A1 | 11/2014 | Ben-Shmuel et al. | |
| 2015/0034632 A1 | 2/2015 | Brill et al. | |
| 2015/0070029 A1 | 3/2015 | Libman et al. | |

FOREIGN PATENT DOCUMENTS

| | | | |
|---|---|---|---|
| EP | 0268329 | A1 | 5/1988 |
| EP | 0 526 297 | | 2/1993 |
| EP | 0268329 | * | 4/1994 |
| EP | 2 391 154 | | 1/2004 |
| EP | 1956301 | A1 | 8/2008 |
| EP | 2031306 | A1 | 3/2009 |
| EP | 2051564 | A1 | 4/2009 |
| WO | WO 2007/096877 | A2 | 8/2007 |
| WO | WO 2007/096878 | * | 8/2007 |
| WO | WO 2008/007368 | * | 1/2008 |
| WO | WO 2008/102360 | A2 | 8/2008 |
| WO | WO 2010/052723 | * | 5/2010 |
| WO | WO 2010/052724 | * | 5/2010 |
| WO | WO 2011/058537 | * | 5/2011 |
| WO | WO 2011/058538 | * | 5/2011 |

OTHER PUBLICATIONS

Office Action dated Nov. 20, 2018 issued in U.S. Appl. No. 15/970,508.

* cited by examiner

PROCESSING OBJECTS BY RADIO FREQUENCY (RF) ENERGY

RELATED APPLICATIONS

This application is a Continuation of U.S. application Ser. No. 13/805,958, filed Dec. 20, 2012 (pending), which is a national phase application of PCT/IB2011/001981, filed Jun. 30, 2011, which claims the benefit of priority to U.S. Provisional Application No. 61/360,532, filed on Jul. 1, 2010. The content of each of the above-identified applications is incorporated in its entirety herein.

BACKGROUND

Electromagnetic waves are used in various applications to supply energy to objects. In the case of radio frequency (RF) radiation for example, electromagnetic energy may be supplied using a magnetron, which is typically tuned to a single frequency for supplying electromagnetic energy only in that frequency. One example of a commonly used device for supplying electromagnetic energy is a microwave oven. Typical microwave ovens supply electromagnetic energy at or about a single frequency of 2.45 GHz.

SUMMARY

An aspect of some embodiments of the invention may include an apparatus for processing an object placed in an energy application zone by applying RF energy to the object via one or more radiating elements. The apparatus may include a processor configured to:

determine a value related to RF power absorbed by the object; and adjust RF energy supply to one or more of the radiating elements in accordance with changes in time derivatives of the value related to RF power absorbed by the object.

In some embodiments, the processor may be configured to receive feedback from the energy application zone, and determine the value related to RF power absorbed by the object based on the received feedback.

Additionally or alternatively, the processor may be configured to receive via an interface one or more criteria for starting a change in RF energy supply to one or more of the radiating elements in accordance with changes in time derivatives of the value related to RF power absorbed by the object.

The interface may include a reader for a machine readable element, for example, a barcode reader.

In some embodiments, the processor may be configured to adjust RF energy supply at each of a plurality of MSEs.

In some embodiments, the processor may be configured to regulate energy supply to one or more of the radiating elements in a plurality of MSEs.

In addition, the processor may be configured to regulate energy supply to one or more of the radiating elements at each of a plurality of MSEs is in accordance with a dissipation ratio estimated at said each of a plurality of MSEs.

According to some embodiments, the processor is configured to cause supply of more energy at MSEs associated with lower dissipation ratios.

In some embodiments, the processor may be configured to monitor the value related to RF power absorbed by the object, and identify changes in time derivatives of the value related to RF power absorbed by the object.

In some embodiments, the value related to RF power absorbed by the object may be a difference between power delivered to the energy application zone and power detected from the energy application zone.

An aspect of some embodiments of the invention may include a method of processing an object in an energy application zone, the method comprising:

applying radio frequency (RF) energy to the energy application zone;

monitoring a value related to RF power absorbed by the object during the RF energy application; and adjusting the application of RF energy in accordance with changes in a time derivative of the monitored value.

The monitored value may be indicative of a volume of the object.

In some embodiments, monitoring a value related to RF power absorbed by the object may include monitoring a product of the power delivered into the energy application zone and a dissipation ratio.

Additionally or alternatively, monitoring a value related to RF power absorbed by the object includes monitoring a dissipation ratio, averaged on MSEs.

Additionally or alternatively, monitoring a valued indicative of RF power absorbed by the object may include monitoring a difference between power delivered to the energy application zone and power detected from the energy application zone.

Still additionally or alternatively, monitoring a value related to RF power absorbed by the object may include monitoring a difference between power delivered to the energy application zone and power detected from the energy application zone, corrected for known energy losses other than losses to the object.

In some embodiments, the dissipation ratio may be corrected to compensate for known energy losses in the zone other than energy absorption by the object.

Consistent with some embodiments, applying RF energy may be with a power supply, and the monitoring may include:

measuring power provided by the power supply; and estimating, based on the measured power, the power absorbed by the object.

In some embodiments, applying RF energy may include delivering energy in a plurality of MSEs.

In some embodiments, delivering energy in an MSE is in accordance with a dissipation ratio estimated at said MSE.

Consistent with some embodiments, adjusting RF energy application may include changing an intensity of the applied RF energy.

In some embodiments, adjusting may include reducing the intensity of the RF energy. For example, adjusting may include cutting off the RF energy application.

In some embodiments, the adjusting may include cutting off the applying of RF energy as the time derivative of the value related to RF power absorbed by the object ceases to change.

In some embodiments, the adjusting comprises cutting off the applying of RF energy after the value related to RF power absorbed by the object ceases to change.

A method according to some embodiments, may include determining an amount of time; and when the time derivative of the value related to RF power absorbed by the object significantly changes, continuing to apply RF energy for the determined amount of time; and then cutting off the applying of RF energy.

A method according to some embodiments may include determining an amount of energy;

when the time derivative of the value related to RF power absorbed by the object significantly changes, continuing to apply RF energy until the determined amount of energy is absorbed in the object; and then cutting off the applying of RF energy.

In some embodiments, a method may include determining a portion;

detecting the amount of energy absorbed by the object until a significant change in the time derivative of the value related to RF power absorbed by the object occurs;

after said occurrence, continuing to apply RF energy until the object absorbs an amount of energy equal to the product of the determined portion multiplied by the detected amount of energy; and then cutting off said applying of RF energy.

Consistent with some embodiments, the object may include a food product. The food product may include, for example, dough, in which case, the time derivative may be indicative of a rising pace of the dough. The rising may be during a baking process induced by the RF energy application.

In some embodiments, the food product may be a member of a group consisting of: a soufflé, a sponge cake, and a chocolate cake.

In some embodiments, the adjusting may be in response to an end of expansion event of the object. Alternatively, the adjusting may be in response to a start of expansion event of the object.

In some embodiments, the RF energy may be applied in a plurality of frequencies, and the monitoring may be performed in a plurality of frequencies selected from the applied plurality of frequencies.

An aspect of some embodiments may concern a device, which includes an energy application zone;

a dielectric heating unit configured to apply radio frequency (RF) energy to the energy application zone; and a controller configured to compute a time derivative of RF power absorbed by an object placed in the energy application zone, wherein said controller causes said dielectric heating unit to adjust the amount of RF energy delivered to the energy application zone according to a change in the time derivative of RF power absorbed by the object.

The dielectric heating unit may apply the RF energy in a plurality of MSEs.

An aspect of some embodiments may include a device for applying radio frequency (RF) energy to an energy application zone. The device may include:

a dielectric heating unit; and a controller, wherein the controller is configured to compute a time derivative of RF power absorbed by an object placed in the energy application zone, and causes the dielectric heating unit to adjust the RF energy applied to the energy application zone according to a change in the time derivative of the RF power absorbed by the object.

An aspect of some embodiments may include a method of processing a food object. The method may include:

a) heating the food object in an energy application zone by applying radio frequency (RF) energy to the energy application zone;

b) detecting presence or absence of a change in the time derivative of power absorption by the food object; and c) adjusting said heating of said food object in response to said detecting.

An aspect of some embodiments of the invention may include a method of controlling volume change of an object heated by RF in an energy application zone, the method comprising:

defining a desirable volume change;

applying RF energy to the energy application zone;

monitoring the power adsorbed in the object; and adjusting the application of RF energy to obtain the desirable volume change, In some embodiments, the desirable volume change is expansion of the object, and the energy application is continued as power adsorption increases and stopped when power adsorption stops increasing or when power adsorption starts decreasing.

In some embodiments, the desirable volume-change is no volume change, and when increase or decrease in absorbed power is monitored, RF energy application is substantially reduced.

As used herein, if a machine (e.g., a processor) is described as "configured to" perform a task (e.g., configured to determine a value related to RF power absorbed), then, at least in some embodiments, the machine performs this task during operation. Similarly, when a task is described as being done "in order to" establish a target result (e.g., in order to change the field pattern in the zone), then, at least in some embodiments, carrying out the task would accomplish the target result.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not Intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In some embodiments of the invention, one or more tasks according to exemplary embodiments of method and/or system as described herein are performed by a processor, such as a computing platform for executing a plurality of instructions. Optionally, the processor includes a volitile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
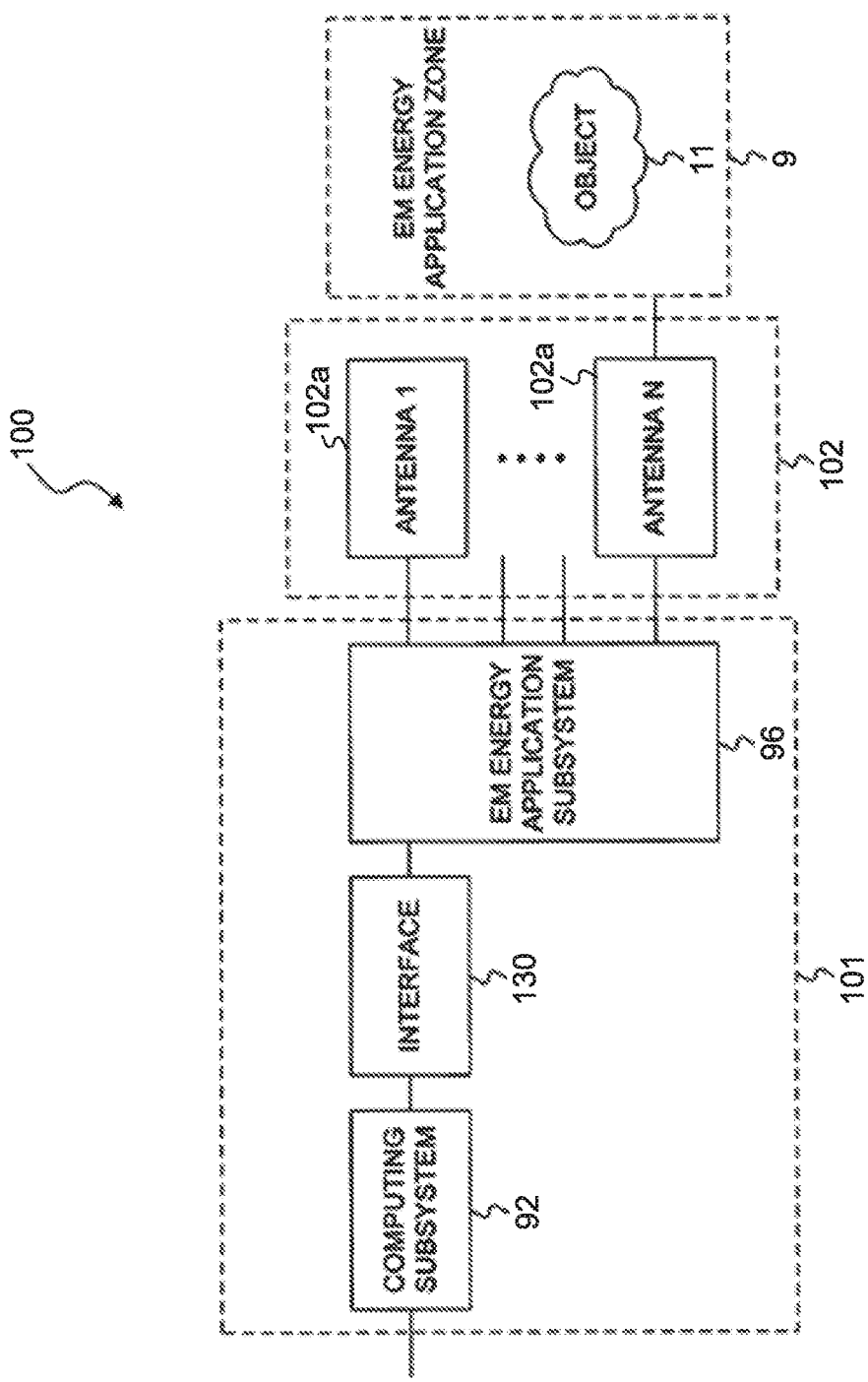
FIG. 1 is a diagrammatic representation of an apparatus for applying electromagnetic energy to an object according to some embodiments of the invention.

The present invention, in some embodiments thereof, relates to system processing objects using electromagnetic (EM) energy. More particularly, but not exclusively, some embodiments of the invention relate to controllable heating of objects, for example, food objects.

References to an "object" (or "object to be heated") to which electromagnetic energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses any and all of the following, for example: food to be defrosted or cooked; clothes or other wet material to be dried; frozen organs to be thawed; chemicals to be reacted; fuel or other combustible material to be combusted; hydrated material to be dehydrated, gases to be expanded; liquids to be heated, boiled or vaporized, or any other material for which there is a desire to apply electromagnetic energy to any degree.

The term electromagnetic energy, as used herein, includes any or all portions of the electromagnetic spectrum, including but not limited to, radio frequency (RF), infrared (IR), near infrared, visible light, ultraviolet, etc. Applying energy in the RF portion of the electromagnetic spectrum is referred herein "as applying RF energy." In one particular example, applied electromagnetic energy may include RF energy with a wavelength in free space of 100 km to 1 mm, which corresponds to a frequency range of 3 KHz to 300 GHz. In other examples, applied electromagnetic energy may fall within frequency bands between 500 MHz to 1500 MHz or between 700 MHz to 1200 MHz or between 800 MHz to 1 GHz. In some other examples, the applied electromagnetic energy may fall only within one or more ISM frequency bands, for example, between 433.05 and 434.79 MHz, between 902 and 928 MHz, between 2400 and 2500 MHz, and/or between 5725 and 5875 MHz. Microwave and ultra high frequency (UHF) energy, for example, are both within the RF range. Even though examples of the invention are described herein in connection with the application of RF energy, these descriptions are provided to illustrate a few exemplary principles of the invention and are not intended to limit the invention to any particular portion of the electromagnetic spectrum.

In some embodiments of the invention, heating is controlled in accordance with an observed change in a variable. The variable may be indicative of a property of the object. For example, the variable may be the rate of energy absorption by the object, which in turn may be indicative of the volume of the object, and/or of the water content of the object.

In some embodiment the variable is monitored, and when a predetermined change occurs, energy application is adjusted.

The predetermined change may be a change in time development, as, for example, represented by a time derivative. For example, the change may be that a variable that increases quickly stops increasing, or starts increasing more slowly. In another example, a variable that does not change or changes only slightly may change abruptly.

Energy application may be adjusted, for example, by adjusting the amount of energy applied, the rate of energy application, or in any other manner.

The energy application may be at different MSEs, as these are defined below, for instance, at different frequencies. The monitored variable may be MSE dependent. Alternatively, the monitored value may be MSE independent. For example, the amount of energy absorbed in the object may be an MSE dependent monitored variable. An average amount of energy absorbed over a range of MSEs may be an MSE independent variable.

An aspect of some embodiments includes processing an object. Examples of processing may include carrying out a heating process, for example: thawing, cooking, baking, and/or warming, according to an indication of a change in the volume of the object.

It is noted that in the present disclosure the term "heating an object" includes applying electromagnetic (EM) energy to the object. At times, an object may be heated without temperature increase (e.g., when it is concomitantly cooled at a rate that is at least equal to the heating rate or at a phase change where applied energy is taken up for the phase change). Heating may include thawing, defrosting, raising a temperature of at least a portion of the object, cooking, drying, etc, by applying electromagnetic energy.

Consistent with some embodiments, feedback from the heated object may be used as an indication of a property change of the heated object (e.g. volume change), and the heating may proceed taking into account the indicated change. For example, in some embodiments, if an indicated volume change is undesired, the heating may be reduced and/or stopped.

In some embodiments, the indicated volume change is not necessarily desired or undesired, and may be used as an indication for a need to change a heating protocol. The same is true regarding changes that are not indicative to volume change. Such changes may also be used as indication for switching from one heating protocol to another, for reducing energy application, for stopping energy application, or for any other change in the energy application process.

In some embodiments, a parameter indicative of the object volume is monitored, and the heating is adjusted in accordance with changes in the monitored parameter, with or without explicit identification of a volume change.

Adjusting in accordance with a change as used herein may mean adjusting after the change occurs and does not necessarily reflect any other relationship between the change and the adjustment made in accordance with the change.

An aspect of some embodiments includes controlling application of RF energy according to feedback indicative of amounts of power adsorbed in the object. In some embodiments, the control is according to changes in time derivative of a value related to the absorbed power. The value related to the absorbed power may be, for example an average (over a plurality of MSEs) of dissipation ratios.

For example, if an increase in adsorbed power is not desired, whenever such raise is detected, the incident power may be reduced. In another example, if a change in power adsorbed is desirable, energy application may be stopped (or otherwise adjusted) when the increase ceases.

Consistent with some embodiments, heating is by RF energy and the parameter indicative of the object's volume includes rate of RF energy absorption in the object during heating, also referred herein as "absorbed power." In practice, the absorbed power may be monitored, with changes in absorbed power being treated as indicative of a property change, for example, of a volume change.

In some embodiments, the absorbed power is defined as the difference between input power and detected power.

Input power may be defined as the power applied by one or more radiating elements (also referred to herein as antennas or feeds) to an energy application zone, inside which the object or a portion thereof is heated.

An energy application zone may include any void, location, region, or area where electromagnetic energy may be applied. The zone may be hollow, or may be filled or partially filled with liquids, solids, gases, or combinations thereof. By way of example only, energy application zone 9 may include an interior of an enclosure, interior of a partial enclosure, open space, solid, or partial solid, that allows existence, propagation, and/or resonance of electromagnetic waves. An energy application zone may include a conveyor belt or a rotating plate. For purposes of this disclosure, all such energy application zones may alternatively be referred to as "cavities." It is to be understood that an object is considered "in" the energy application zone if at least a portion of the object is located in the zone or if some portion of the object receives delivered electromagnetic radiation.

Exemplary energy application zone may include locations where energy is applied in an oven, chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the energy application zone may be part of a vending machine, in which objects are processed once purchased. Thus, consistent with the presently disclosed embodiments, an energy application zone may include an electromagnetic resonator, also known as cavity resonator, or cavity. At times, an energy application zone may be congruent with the object or a portion of the object (e.g., the object or a portion thereof, is or may define the energy application zone).

Detected power may be defined as the power received by one or more of the feeds. In some embodiments, the detected power may be the sum of powers received by all the feeds. Alternatively, the detected power may be the sum of powers received by some of the feeds. Alternatively or additionally, the detected power may comprise power detected by detectors that are not feeds.

A value related to absorbed power may include, for example, a value indicative of absorbed power. A value indicative of the absorbed power may be any value that may correspond to the absorbed power. For example, in some embodiments, received powers may be summed to obtain a detected power, and the difference between incident power applied by the radiating element to the energy application zone and the detected power may be considered indicative of the absorbed power. This difference may be referred to as dissipated power. In some embodiments, the value indicative of absorbed power may be the absorbed energy, which may correspond to an integral of the absorbed power over time.

In some embodiments, the absorbed power is defined as the product of the input power by a dissipation ratio. Dissipation ratio is sometimes referred to as dissipation rate and/or as energy absorption efficiency in the present disclosure and in some of the patent applications listed in Table I.

The dissipated power may be defined as the difference between input power and detected power. Dissipated power may be MSE dependent, for example, at different frequencies, different amounts of power may be absorbed.

In some embodiments, the detected power may be given by equation (1) below, wherein D is the detected power, $Input_i$ is the power delivered to the zone by feed i, and $S_{i,j}$ $S_{i,j}$ is the power received at feed j when feed i delivered energy to the zone, and n is the number of feeds.

$$D = \sum_{i=1}^{n} Input_i \sum_{i=1}^{n} S_{i,j} \qquad (1)$$

It is noted that, in practice, there may exist some energy that is delivered to the energy application zone and is neither absorbed nor detected. For example, some energy may leak through a door of the cavity, dissipate in the cavity walls, or be lost by another mechanism. In some embodiments, lost power is neglected. In some embodiments, the absorbed power calculated as described above may be corrected to compensate for losses.

For example, in some embodiments, it is known that a constant energy loss takes place. In such embodiments, the known constant loss may be subtracted from the calculated absorbed power to obtain another variable indicative of the absorbed power, which may, sometimes, also be indicative of the volume. However, when changes in volume are primarily used to control the heating, such correction may be of marginal importance, if any, because a constant loss does not affect observed changes in power absorption.

Adjusting energy application (e.g., adjusting one or more parameters of energy application) may include increasing, decreasing, nullifying, and/or maximizing a characteristic of the delivered RF energy. For example, the intensity of the RF energy may be reduced if the change in absorbed power is greater than a specified threshold. Additionally or alternatively, adjusting energy application may include changing a selection of MSEs used for energy application, for example, before adjustement, energy may be applied at a first frequency band, and after adjustment, energy may be applied at another frequency band.

Consistent with some embodiments, the energy delivered (applied) to the energy application zone may be capable of being absorbed only within a certain volume, while objects out of that certain volume may not absorb energy. On the other hand, objects that are inside that certain volume and grow bigger, may absorb a larger portion of the delivered energy as they grow, at least as long as they do not grow out of the certain volume. In such embodiments, the power absorbed by the object may depend on the volume of the object.

According to some embodiments, a multi phase method for applying EM energy to an object (e.g., for heating the object) may be provided. The method may include two or more phases. For example, in some embodiments, the method may comprise one or more phases in which energy application is adjusted according to a change in absorption monitored variable, and one or more phases wherein energy application is not so adjusted. In some embodiments, the phases may differ from each other by the manner in which energy application is adjusted, for example, in one phase, when the monitored variable (e.g. absorbed power) changes by a specified amount, energy application may increase, and in another phase, the energy application may decrease in response to a similar change in absorbed power.

The timing and the extent of the phases may be set in advance or changed dynamically during a multi phase energy application (e.g., heating) process.

In some embodiments, information regarding the heating process, for example, criteria for switching from one phase to another, and/or characteristics of one or more of the phases (for instance, a frequency band) may be encoded on a machine readable element. The machine readable element may be associated with the object. In some embodiments, the information encoded in the machine readable element may be used by a processing device (e.g. an oven) when processing the object.

It is to be understood that the invention is not necessarily limited in its application to the details of construction and the arrangement of the components and/or methods set forth in the following description and/or illustrated in the drawings and/or the Examples. The invention is capable of other embodiments and may be practiced or carried out in various ways.

In the following paragraphs, reference is made to dielectric heating unit. As used herein, a dielectric heating unit is a heating unit that uses radio frequency (RF) energy for processing an object, e.g., thawing, heating, proofing, rising, and/or causing any change in a temperature and/or texture of an object, e.g., a food object placed (wholly or partially) in an energy application zone. The dielectric heating unit may include radiating elements for applying the RF energy and a source for supplying the RF energy optionally via amplifiers.

In accordance with some embodiments of the invention, an apparatus or method may involve the use of at least one source configured to deliver electromagnetic energy to the energy application zone. A "source" may include any component(s) that are suitable for generating and delivering electromagnetic energy. Consistent with some embodiments of the invention, electromagnetic energy may be delivered to the energy application zone in the form of propagating electromagnetic waves at predetermined wavelengths or frequencies (also known as electromagnetic radiation). As used consistently herein, "propagating electromagnetic waves" may include resonating waves, evanescent waves, and waves that travel through a medium in any other manner. Electromagnetic radiation carries energy that may be imparted to (or dissipated into) matter with which it interacts.

For example, the dielectric heating unit may be defined as described in one or more of the documents listed in Table 1 below, all of which are incorporated herein by reference:

TABLE 1

| Title | Country | Serial and publication numbers | hereinafter |
|---|---|---|---|
| Electromagnetic heating | PCT | IL2007/000235 WO07/096878 | '235 |
| Electromagnetic heating | PCT | IL2007/000236 WO07/096877 | '236 |
| Food preparation | PCT | IL2007/000864 WO08/007368 | '864 |
| Device and method for heating using RF energy | PCT | Filed on 10 Nov. 2009 WO10/052724 | '724 |
| Device and method for controlling energy | PCT | Filed on 10 Nov. 2009 WO10/052723 | '723 |
| Device and Method for Heating Using RF Energy | PCT | Filed on 10 May 2010 WO 2011/058538 | '538 |
| Device and method for controlling energy | PCT | Filed on 10 May 2010 WO 2011/058537 | '537 |
| System and method for applying electromagnetic energy | US | Filed on Apr. 5, 2011 13/080,072 | '072 |

FIG. 1 is a diagrammatic representation of a dielectric heating unit 100 (also referred herein as apparatus 100) for applying electromagnetic energy to an object according to some embodiments of the invention. Apparatus 100 may include a controller 101, an array of antennas 102 including one or more antennas (each marked as 102a), and energy application zone 9. Controller 101 may be configured to estimate a change in the object property with a changed in the monitored variable. For example, the controller may be preprogrammed with a lookup table associating monitored variables or changes in their time derivatives with object properties. Controller 101 may be electrically coupled to one or more antennas 102. As used herein, the term "electrically coupled" refers to one or more either direct or indirect electrical connections. Controller 101 may include a computing subsystem 92, an interface 130, and an electromagnetic energy application subsystem 96. Based on an output of computing subsystem 92, energy application subsystem 96 may respond by generating one or more radio frequency signals to be supplied to antennas 102. In turn, the one or more antennas 102 may radiate electromagnetic energy into energy application zone 9. In certain embodiments, this energy can interact with object 11 positioned within energy application zone 9.

Controller 101 may be configured to carry out one or more methods of the present invention. For example, controller 101 may be configured to monitor a variable, identify changes in a time derivative of the monitored variable, and/or adjust energy application when such a change is identified.

Consistent with some presently disclosed embodiments, computing subsystem 92 may include a general purpose or special purpose computer. Computing subsystem 92 may be configured to generate control signals for controlling electromagnetic energy application subsystem 96 via interface 130. Computing subsystem 92 may receive measured signals from electromagnetic energy application subsystem 96 via interface 130. Computing subsystem 92 may, for example, calculate time derivatives of measured signals received from subsystem 96, identify a change in the time derivative, and generate control signals for controlling subsystem 96 according to the identified change.

While controller 101 is illustrated for exemplary purposes as having three subcomponents, control functions may be consolidated in fewer components, or additional components may be included consistent with the desired function and/or design of a particular embodiment.

Exemplary energy application zone 9 may include locations where energy is applied in an oven, chamber, tank, dryer, thawer, dehydrator, reactor, engine, chemical or biological processing apparatus, furnace, incinerator, material shaping or forming apparatus, conveyor, combustion zone, cooler, freezer, etc. In some embodiments, the energy application zone may be part of a vending machine, in which objects are processed once purchased. Thus, consistent with the presently disclosed embodiments, energy application zone 9 may include an electromagnetic resonator 10 (also known as cavity resonator, or cavity, and may be also referred to herein as a chamber) (illustrated for example in FIG. 09). At times, energy application zone 9 may be congruent with the object or a portion of the object (e.g., the object or a portion thereof, is or may define the energy application zone)

Figure 2:
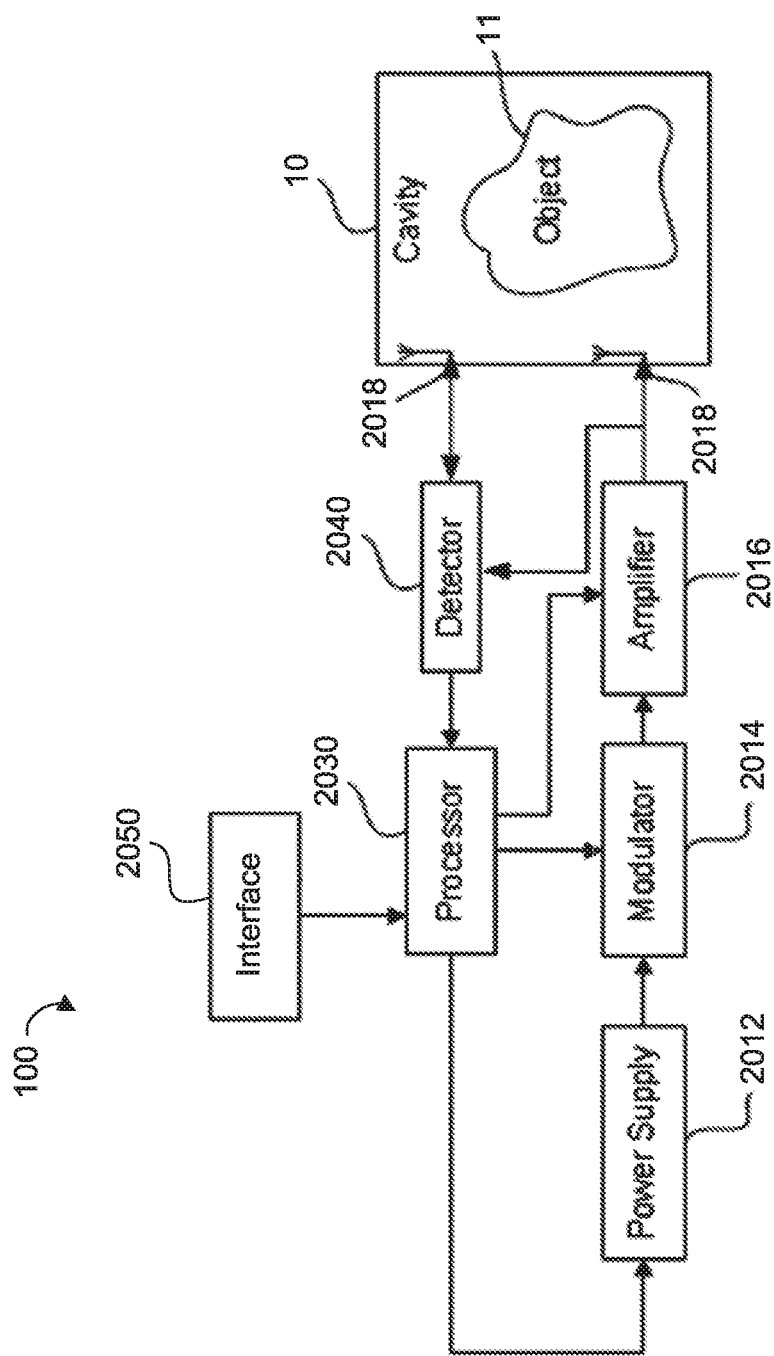
FIG. 2 is a block diagram of an apparatus according to some embodiments of the invention.

FIG. 2 is a simplified block diagram of a dielectric heating unit 100, (also referred herein as an apparatus 100) according to some embodiments of the invention. In accordance with some embodiments, apparatus 100 may include a processor 2030 which may regulate modulations performed by modulator 2014. In some embodiments, modulator 2014 may include at least one of a phase modulator, a frequency modulator, and an amplitude modulator configured to modify the phase, frequency, and amplitude of the AC waveform, respectively. Processor 2030 may alternatively or additionally regulate at least one of location, orientation, and configuration of each radiating element 2018, for example, using an electromechanical device. Such an electromechanical device may include a motor or other movable structure for rotating, pivoting, shifting, sliding or otherwise changing the orientation and/or location of one or more of radiating elements 2018. Alternatively or additionally, processor 2030 may be configured to regulate one or more field adjusting elements located in the energy application zone, in order to change the field pattern in the zone.

In some embodiments, apparatus 100 may involve the use of at least one source configured to deliver electromagnetic energy to the energy application zone. By way of example, and as illustrated in FIG. 2, the source may include one or more of a power supply 2012 configured to generate electromagnetic waves that carry electromagnetic energy. For example, power supply 2012 may be a magnetron configured to generate high power microwave waves at a predetermined wavelength or frequency. Alternatively, power supply 2012 may include a semiconductor oscillator, such as a voltage controlled oscillator, configured to generate AC waveforms (e.g., AC voltage or current) with a constant or varying frequency. AC waveforms may include sinusoidal waves, square waves, pulsed waves, triangular waves, or another type of waveforms with alternating polarities. Alternatively, a source of electromagnetic energy may include any other power supply, such as electromagnetic field generator, electromagnetic flux generator, or any mechanism for generating vibrating electrons.

In some embodiments, apparatus 100 may include a phase modulator (not Illustrated) that may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate modulation based on feedback from the energy application zone. For example, processor 2030 may be configured to receive an analog or digital feedback signal from detector 2040, indicating for example an amount of electromagnetic energy received from cavity 10, and processor 2030 may dynamically determine a time delay at the phase modulator for the next time period based on the received feedback signal.

In some embodiments, apparatus 100 may include a frequency modulator (not illustrated). The frequency modulator may include a semiconductor oscillator configured to generate an AC waveform oscillating at a predetermined frequency. The predetermined frequency may be in association with an input voltage, current, and/or other signal (e.g., analog or digital signals). For example, a voltage controlled oscillator may be configured to generate waveforms at frequencies proportional to the input voltage.

Processor 2030 may be configured to regulate an oscillator (not illustrated) to sequentially generate AC waveforms oscillating at various frequencies within one or more predetermined frequency bands. In some embodiments, a predetermined frequency band may include a working frequency band, and the processor may be configured to cause the transmission of energy at frequencies within a subportion of the working frequency band. A working frequency band may be a collection of frequencies selected because, in the aggregate, they achieve a desired goal, and there is diminished need to use other frequencies in the band if that sub-portion achieves the goal. Once a working frequency band (or subset or sub-portion thereof) is identified, the processor may sequentially apply power at each frequency in the working frequency band (or subset or sub-portion thereof). This sequential process may be referred to as "frequency sweeping." In some embodiments, based on the feedback signal provided by detector 2040, processor 2030 may be configured to select one or more frequencies from a frequency band, and regulate an oscillator to sequentially generate AC waveforms at these selected frequencies.

Alternatively or additionally, processor 2030 may be further configured to regulate amplifier 2016 to adjust amounts of energy, delivered via radiating elements 2018, based on the feedback signal. Consistent with some embodiments, detector 2040 may detect an amount of energy reflected from the energy application zone and/or energy transmitted at a particular frequency, and processor 2030 may be configured to cause the amount of energy delivered at that frequency to be low when the reflected energy and/or transmitted energy is low. Additionally or alternatively, processor 2030 may be configured to cause one or more antennas to deliver energy at a particular frequency over a short duration when the reflected energy is low at the particular frequency.

In some embodiments, the apparatus may include more than one source of EM energy. For example, more than one oscillator may be used for generating AC waveforms of differing frequencies. The separately generated AC waveforms may be amplified by one or more amplifiers. Accordingly, at any given time, radiating elements 2018 may be caused to simultaneously transmit electromagnetic waves at, for example, two differing frequencies to cavity 10.

Processor 2030 may be configured to regulate the phase modulator in order to alter a phase difference between two electromagnetic waves supplied to the energy application zone. In some embodiments, the source of electromagnetic energy may be configured to supply electromagnetic energy in a plurality of phases, and the processor may be configured to cause the transmission of energy at a subset of the plurality of phases. By way of example, the phase modulator may include a phase shifter. The phase shifter may be configured to cause a time delay in the AC waveform in a controllable manner within cavity 10, delaying the phase of an AC waveform anywhere from between 0-360 degrees.

In some embodiments, a splitter (not illustrated) may be provided in apparatus 100 to split an AC signal, for example generated by an oscillator, into two AC signals (e.g., split signals). Processor 2030 may be configured to regulate the phase shifter to sequentially cause various time delays such that the phase difference between two split signals may vary over time. This sequential process may be referred to as "phase sweeping." Similar to the frequency sweeping described above, phase sweeping may involve a working subset of phases selected to achieve a desired energy application goal.

The processor may be configured to regulate an amplitude modulator in order to alter an amplitude of at least one electromagnetic wave supplied to the energy application zone. In some embodiments, the source of electromagnetic energy may be configured to supply electromagnetic energy in a plurality of amplitudes and the processor may be configured to cause the transmission of energy at a subset of the plurality of amplitudes. In some embodiments, the apparatus may be configured to supply electromagnetic energy through a plurality of radiating elements and the processor may be configured to supply energy with differing amplitudes simultaneously to at least two radiating elements.

Although FIG. 2 illustrates a circuit including two radiating elements (2018), it should be noted that any suitable number of radiating elements may be employed, and the circuit may select combinations of MSEs through selective use of radiating elements. By way of example only, in an apparatus having three radiating elements A, B, and C, amplitude modulation may be performed with radiating elements A and B, phase modulation may be performed with radiating elements B and C, and frequency modulation may be performed with radiating elements A and C. In some embodiments amplitude may be held constant and field changes may be caused, for example, by switching between radiating elements and/or subsets of radiating elements. Further, radiating elements may include a device that causes their location or orientation to change, thereby causing field pattern changes. The combinations are virtually limitless, and the invention is not limited to any particular combination, but rather reflects the notion that field patterns may be altered by altering one or more MSEs.

An apparatus (e.g. apparatus 100 of FIG. 1 and FIG. 2) for processing an object may be, according to some embodiments of the present invention, as illustrated in FIG. 1 and FIG. 2. Object (11) may be placed, wholly or partially, in energy application zone 9 (e.g., cavity 10), and processed by applying RF energy thereto via one or more radiating elements (102*a*, 2018). Apparatus 100 may include a processor (2030) and/or a controller (101) configured to determine a value indicative of RF power absorbed by the object; and adjust RF energy supply to one or more of the radiating elements in accordance with changes in time derivatives of the determined value.

Processor 2030 and/or controller 101 may be configured to receive feedback from the energy application zone, and determine the value indicative of RF power absorbed by the object based on the received feedback.

The feedback may include, for instance, power intensities detected by various sensors, for instance, by radiating elements 2018 or 102*a*.

In some embodiments, processor 2030 and/or controller 101 may be configured to adjust RF energy supply at each of a plurality of MSEs.

In some embodiments, the processor may be configured to regulate energy supply to one or more of the radiating elements in a plurality of MSEs.

In some embodiments, energy application at each of the MSEs is regulated in accordance with a dissipation ratio estimated at the same MSE. This regulation may be according rules, and the processor may be configured to adjust the rules according to changes in time derivatives of a value indicative of RF power absorbed by the object.

Apparatus 100 may include interface 2050 for receiving data and/or information from outside apparatus 100. The interface may include, for instance, a keypad, a touch screen, a barcode reader, or any other data entry mechanism.

Processor 2030 and/or controller 101 may be configured to receive, e.g., via Interface 130 and or 2050 one or more rules for changing RF energy supply to one or more of the radiating elements in accordance with changes in time derivatives of the value indicative of RF power absorbed by the object.

For example, in some embodiments, the amount of energy applied at each MSE may be a function of a dissipation ratio. The rules may include the specific function. In some embodiments, the function may be parametric, and the rules received from the interface include parameters of the function. For example, the applied energy may be the same for each MSE where the dissipation ratio is below a first threshold, and inversely related to the dissipation ratio for each MSE where the dissipation ratio is above the first threshold. The apparatus may receive via the interface the threshold value.

In some exemplary embodiments of the invention, a frozen pizza (or any other object 11) is to be cooked or otherwise processed by RF energy. The object 11 pizza may have a barcode attached to its package, and a barcode reader (being a part of interface 2050 or 130) may read the barcode. The processor (2030, 130) may decode the information from the barcode to read that when the average dissipation ratio, or any other value indicative of the power absorbed by the pizza, stops changing, energy application should be adjusted.

The object (11) is placed in the energy application zone (9, 10), and energy may be applied to it. Feedback may be detected from the object (e.g., with detector 2040), and the average dissipation ratio may be determined, based on this feedback, and monitored. When the monitored value stops changing in time, energy application may be adjusted. For instance, the energy may be increased.

Figure 3:
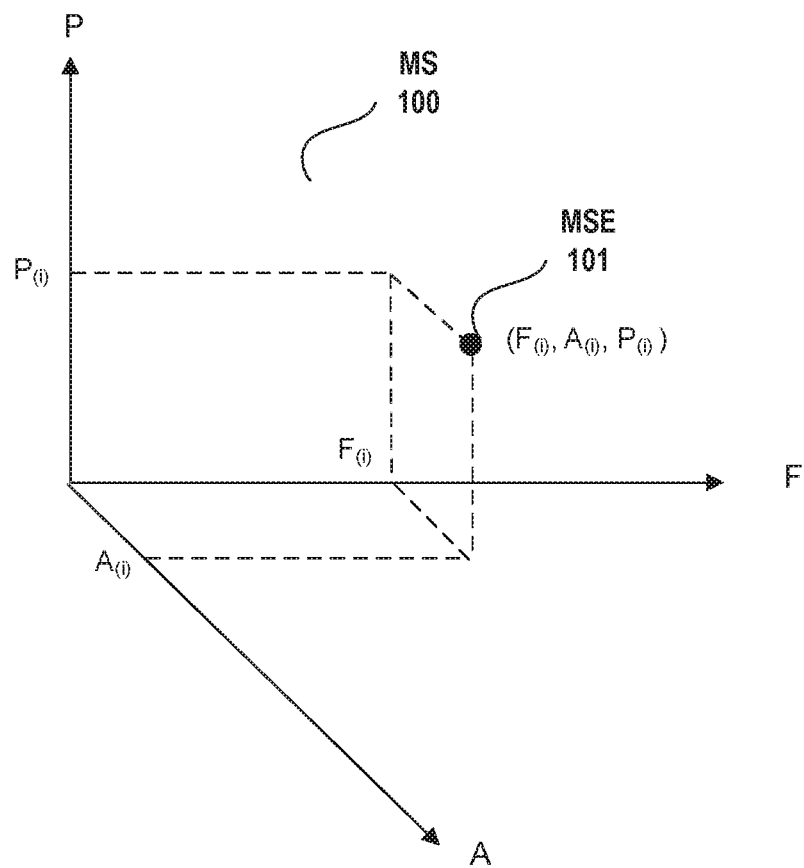
FIG. 3 is a graphical representation of a modulation space (MS), according to some embodiments of the present invention.

In some exemplary embodiments, the processor may determine a dissipation ratio at a plurality of modulation space elements (MSEs). In some embodiments, energy application may be adjusted based on the dissipation ratio at each MSE, (e.g., an energy delivery level (weight) may be set at the same MSE). The dissipation ratio may be defined as 1−D/I, where D is the detected power, as defined below, and I is the power delivered to the energy application zone, also referred herein as input power. The term MSE refers to a specific set of values of the variable parameters in a modulation space (MS), for example as depicted in FIG. 3. The term "modulation space" or "MS" is used to collectively refer to all the parameters that may affect a field pattern in the energy application zone and all combinations thereof. For example, the "MS" may include a number of radiating elements (antennas), their positioning and/or orientation (if modifiable), the useable bandwidth, a set of all useable frequencies and any combinations thereof, power settings, phases, etc. The MS may have any number of possible variable parameters, ranging between one parameter only (e.g., a one dimensional MS limited to frequency only or phase only or other single parameter), two or more dimensions (e.g., varying frequency and amplitude together within the same MS), or many more.

The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, FIG. 3 shows an MSE 101 in the three-dimensional MS 100. MSE 101 has a specific frequency F(i), a specific phase P(i), and specific amplitude A(i). If even one of these MSE variables change, then the new set defines another MSE. For example, (3 GHz, 30°, 12 V) and (3 GHz, 60°, 12 V) are two different MSEs, which differ from each other only by the phase component.

In some embodiments, the energy applied to an object at each MSE is inversely related to the dissipation ratio at the same MSE. In some embodiments, an upper threshold of applied energy may be defined. Optionally, more energy is applied by delivering energy at higher power. Additionally or alternatively, more energy is applied by delivering energy for longer periods.

Figure 4:
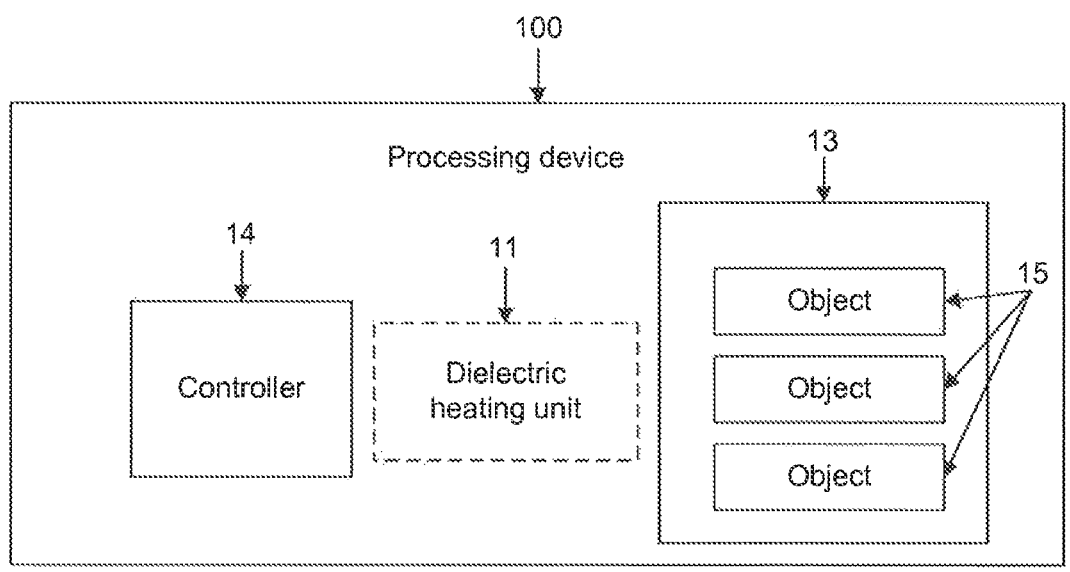
FIG. 4 is a schematic illustration of a device for processing an object placed in an energy application zone by applying RF energy, according to some embodiments of the present invention.

Reference is now made to FIG. 4, which is a schematic illustration of a processing device 100 (also referred herein as apparatus 100), for processing object(s) 15 placed in an energy application zone 13 by applying RF energy, according to some embodiments of the invention. The device may be configured to process object(s) 15 by adjusting the RF energy that is delivered to the object (e.g., adjust energy application) according to a change in the time derivative of RF power absorption. The RF power absorption by object 15 during a heating process may be indicative of a volume of object 15, and the time derivative of the power absorption may be indicative of the time development of the volume of the object. For example, increase in the absorbed power may be indicative of an expansion of the object (which is a kind of a volume change). Monitoring the power absorption by the object may allow avoiding excessive or unwanted volume change and/or encouraging desirable volume changes. The term "monitoring a parameter" (for instance, monitoring absorbed power) may be used herein for any action related to detecting and/or keeping track of values related to the parameter, and may include, in some embodiments, observing and/or recording values of the parameter, in some cases, continuously or intermittently. Monitoring may also include processing (e.g., processing performing mathematical and/or logical operations) to obtain values related to the parameter and recording the obtained values.

In some exemplary embodiments, volume change is desirable, and heating may be stopped when there is no further volume change. In such embodiments, RF energy that is delivered to object 15 may be stopped as the absorbed power stops changing (e.g. immediately after or shortly after the absorbed power stops changing. For example, when a dough rises (increases in volume), the power absorbed by the dough increases. At some point, the dough does not rise any more, and the absorbed power stabilizes. At this point, or shortly after that, it may be preferable to stop the RF energy delivery. In some embodiments, such stop may be automatic, and may occur, for example, 0.5, 1, or 2 minutes after the absorbed power stabilizes. In some cases, if the dough is heated after rising, it loses water, and its ability to absorb RF power is decreased. In such cases, it may be advisable to stop heating (e.g., stop energy application) if a drop in the absorbed power is observed after a steady rise.

Thus, according to some embodiments, an amount of time is determined, e.g. before energy application begins, and when a time derivative of the value indicative of RF power absorbed by the object significantly changes, RF energy application continues for the determined amount of time, and then is cut-off.

According to some embodiments, an amount of energy is determined (e.g. before energy application begins, and when a time derivative of the value indicative of RF power absorbed by the object significantly changes), and RF energy application continues until the determined amount of energy is absorbed by the object, and then cut-off.

According to some embodiments, a portion is determined (e.g. before energy application begins), and when a significant change in the time derivative of the value indicative of RF power absorbed by the object occurs, continuing to apply RF energy until the object absorbs an amount of energy equal to the product of the determined portion multiplied by the amount of energy absorbed so far by the object; and then cutting off RF energy application.

According to some embodiments, a desirable volume change may be defined, (e.g. before energy application begins), and RF energy application is adjusted to obtain the desirable volume change. For example, energy application may continue until the desirable volume change is achieved (e.g. until some change in the monitored parameter is observed), and then stopped.

In some embodiments, the predetermined amount of time, energy absorbed, portion, and/or desirable volume change may be encoded, and received by the apparatus from outside the apparatus, for instance, through an interface. In some embodiments, the code is encoded into a barcode or other machine-readable element, which may be associated to the object, and the interface may include a reader for the machine readable element.

The RF energy may be delivered in a plurality of frequencies or MSEs, for example as described in some or all of the patent applications included Table 1. The energy absorption rate (also referred to herein as "power absorption") may be estimated based on an analysis of the power supplied by a power unit that delivers RF energy and/or dissipation ratios in object 15, for example as described above.

Apparatus 100 may integrate a dielectric heating unit 11 which may function as a source (e.g., power supply) for heating object 15. Optionally, dielectric heating unit 11 may include one or more power supplies and one or more power feeds. The power supplies may include one or more amplifiers. Optionally, one or more amplifiers in each of the power feeds may deliver EM waves to the energy application zone 13 where it is at least partially absorbed by object 15. The EM energy (e.g., EM waves) may be delivered to the energy application zone at a plurality of frequencies or MSEs.

Dielectric heating unit 11 may be constructed and operated as described in one or more of the patent applications listed in Table 1 above, with one or more of the changes as detailed herein.

Optionally, dielectric heating unit 11 may includes one or more RF generators and one or more feeds for delivering RF energy to energy application zone 13 at a plurality of frequencies or other MSE's. Optionally, object 15 may be placed at any position in the energy application zone 13, or alternatively object 15 may be placed in accordance with one or more positioning elements, for example, in marked places or specially shaped recesses, etc. In some embodiments the interior of energy application zone 13 may contain positioning elements, for example projections, that assist in the placement and/or positioning and/or orienting of object (s) 15 in energy application zone 13. In some embodiments, positioning elements may include lines, shapes, or text on a surface of energy application zone 13 that help position object(s) 15. For example, a positioning element may include a drawing on the surface of zone 13 that matches the shape of object(s) 15.

In some embodiments, field adjusting element(s) (not illustrated) may be provided in energy application zone 13. Field adjusting element(s) may be adjusted to change the electromagnetic wave pattern in the energy application zone in a way that selectively directs the electromagnetic energy from one or more of radiating elements into object 15. Additionally or alternatively, field adjusting element(s) may be further adjusted to simultaneously match at least one of the radiating elements when emitting, and thus reduce coupling to the other radiating elements.

Apparatus 100 may include a controller 14 for operating dielectric heating unit 11. Controller 14 may include or may be embedded within at least one processor. As used herein, the term "processor" may include an electric circuit that can perform a logic operation on input and/or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The at least one processor may be coincident with or may be part of controller 14 or controller 101.

The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact.

The at least one processor may be configured to cause electromagnetic energy to be applied to energy application zone 13 via one or more radiating elements, for example across a series of MSEs, in order to apply electromagnetic energy at each such MSE to object 15. For example, the at least one processor may be configured to regulate one or more components of controller 14 in order to cause the energy to be applied.

In some embodiments, controller 14 may be configured to operate dielectric heating unit 11 according to readings that correspond to a change, a rate of change, and/or a change in a time derivative, of power absorbed in object 15. In some embodiments, controller 14 may control the operation of dielectric heating unit 11 in accordance with additional readings, for example, readings of temperature of the object.

The absorbed power may be calculated based on knowledge of power input to the energy application zone and dissipation ratio of the object, for example, as described in one or more of the patent applications listed in Table 1.

For example, in some embodiments, the dissipation ratio DR may be defined for a given MSE by the equation $DR=(P_{in}-P_{rf}-P_{cp})/P_{in}$, wherein $P_{in}$ is the incident power, supplied to a radiating element emitting energy to the energy application zone (which may be named an emitting element), $P_{rf}$ is the reflected power, returned to the emitting element, and $P_{cp}$ is the power coupled to radiating elements other than the emitting one. In some embodiments, the dissipation ratio is first measured at some small $P_{in}$, which has negligible contribution to the heating, if any, and then heating is applied using powers that depend on DR. For example, in some embodiments, the $P_{in}$ used during heating may be inversely related to DR. Such inverse relationships bring, in some of the embodiments, similar power absorption at each of the applied MSEs.

Thus, in some embodiments, the change, a rate of change, and/or a change in time derivative, of power absorbed in object 15 may be calculated according to the wattage of the power supply that applies the RF energy during the processing of object 15, optionally, taking into account the DR.

Power absorbed in object 15 may be indicative of the RF energy that is absorbed by the heating object. The calculation of the power absorbed at a certain instance may be indicative of a volume of object 15. This data may allow determining whether to stop, reduce or intensify the power or intensity of the RF energy for example so as to avoid undesired volume changes and/or to cause to a certain volume change during the heating process.

The RF energy may be delivered in a plurality of MSEs (e.g., frequencies). In some embodiments, the amount of power absorbed at each of the MSEs may be calculated, and the obtained amounts may be summed. A calculation per MSE (e.g., per frequency) may be performed according to the power that is delivered at each of the MSEs.

In some embodiments, the change, rate of change, and/or change in time derivative, of power absorbed in object 15 may be indicative of the chemical composition of the object. For example, during thawing, ice may turn into water. At least in some frequencies, ice absorbs RF much less than water. Therefore, as long as the object contains only ice, the absorbed power will be very small. When water forms from melting ice, the absorbed power will be increased rapidly, and this change in time derivative of the absorbed power may be detected and used as an indication to the formation of water. In some embodiments, a heating algorithm (for instance, an algorithm that quantifies a relationship between DR and power in) may be changed upon detection of water formation. For example, total energy supplied at each MSE may be decreased.

Measuring absorbed power may be performed one or more times during the heating process, for example, several times a second. Controller 14 may control (or adjust) one or more characteristics of the heating process, for example the power and/or duration, at which the heating unit delivers energy at each frequency and/or MSE. The one or more characteristics may be controlled based on the measurement of energy absorption efficiency, for example, by adjusting power delivery to compensate for variations of energy absorption. This may be done by adjusting, for example, input power at each frequency and/or MSE, and/or setting a duration time for which power is delivered in each frequency and/or MSE, and/or choosing frequencies and/or MSE's to be delivered and/or adjusting (for example, moving or rotating) one or more field adjusting elements and/or moving the heated object and/or changing antenna characteristics. The characteristic(s) of the heating process may be set before operation, and/or one or more times during operation (for example, several times a second), based on measurements of energy absorption during heating or during a short hiatus in the heating.

Figure 5:
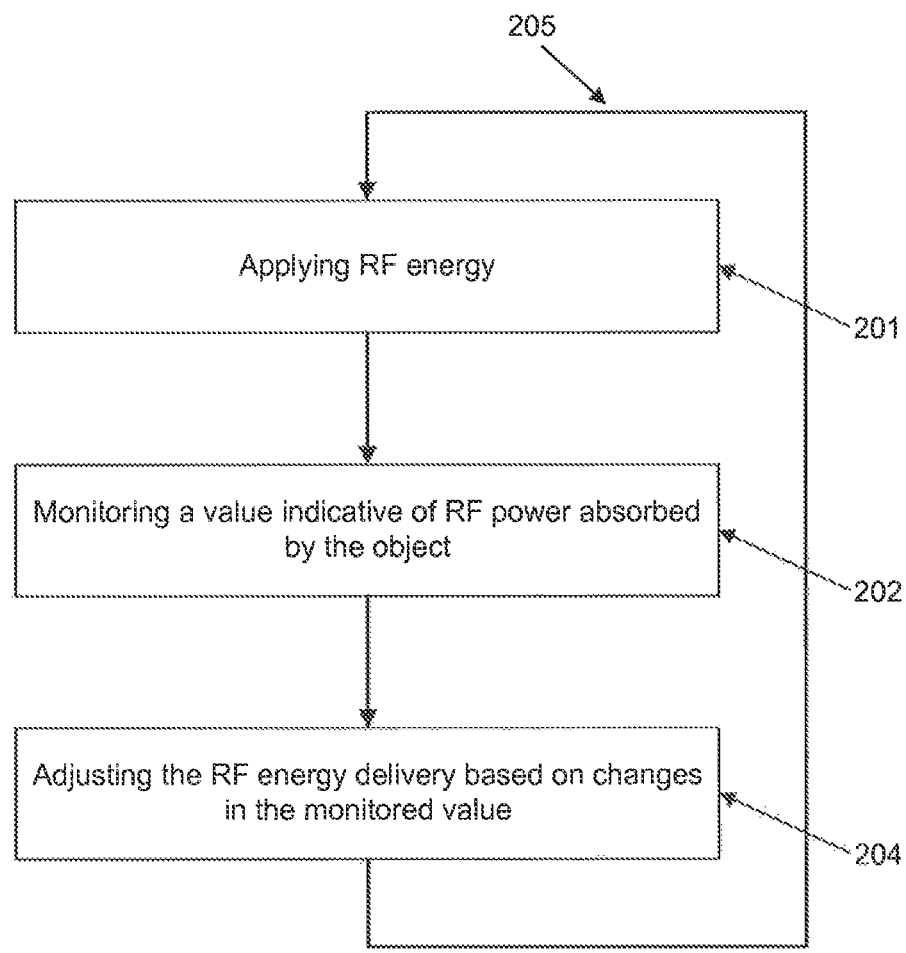
FIG. 5 is a flowchart of a method of processing an object according to an evaluation of RF energy absorption rate, according to some embodiments of the present invention.

Reference is now made to FIG. 5, which is a flowchart of a method 200 of processing an object according to an evaluation of RF energy absorption rate, according to some embodiments of the present invention.

First, as shown at 201, RF energy may be applied (or delivered) to the energy application zone, for example by dielectric heating unit 11, to process object 15. The RF energy may be delivered as radio waves, for example microwaves.

As shown at 202, one or more variables may be monitored. The monitored variables may be related to any relevant aspect of energy absorption by the object and/or the interaction of the object with electromagnetic radiation. For example, the monitored variables may include variables indicative of energy absorbed by the object during the heating process (e.g., during RF energy application). The monitored variables may further include variables relating indirectly to absorbed energy (e.g., reflected, transmitted or emitted energy) or include combinations of variables relating to absorbed energy with variables not relating to absorbed energy. Some examples of variables that may be monitored may include rates of absorption (also referred to herein as "rates of dissipation") and absorbed RF power, for instance, the power absorbed by object 15. Monitoring during the heating process may facilitate calculating a time derivative of the monitored variables, for example: rate of dissipation and/or absorbed power. The time derivative may be monitored in addition or instead of monitoring the absorbed power.

Time derivative(s) of power absorbed by the object and changes in the derivatives may indicate a rising state (e.g., for example a reduction in the rising pace), the end of rising, where the time derivative changes from a positive value, indicative of rising, to zero, and/or a start of rising, where the time derivative changes from about zero to a larger positive value. The rising state may correspond to a volume change of the object. Similarly, the time derivative may be indicative of the existence or absence of water in the sample, or of other change in the sample that may bring to a change in the absorbed power.

The values of the monitored variable may be corrected to compensate for known effects of noise and/or the modus operandi of the apparatus 100 on the monitored variables. For example, rotating plate on which the object is mounted may affect the modus operandi of device 10 on readings of absorbed RF power.

The volume of object 15 may affect the amount of energy absorbed by the object. Therefore, objects with different sizes may absorb different amounts of RF energy.

According to some embodiments of the present invention, the power delivered to the energy application zone is adjusted according to a change of the monitored variables (e.g., RF power absorbed in the object). The monitored variable may be indicative of a property of the object, for instance, its volume. Thus, in some embodiments, dynamic heating processes (e.g., RF energy application), for example as generally described in '235 and '236, may be adjusted according to an evaluation of a volume change, phase change, or other physical or chemical change, for instance as described below.

Optionally, a heating process may include a calibration or an adjustment routine that is performed to the power output of dielectric heating unit 11 during the processing, for example few times a second. The calibration may be performed according to one or more sweeps that allow measuring or estimating power absorbed by the object; see for example FIG. 7 of '235.

Optionally, the power of the dielectric heating unit in a certain instance during the heating process may be used as an indication to the amount of RF energy absorbed by the object. Optionally, an indication may be provided by the power of the dielectric unit multiplied by a dissipation ratio, as dissipation ratio is explained above. Optionally, the indication is a difference between the power of the dielectric unit and the detected power, as detected power is explained above.

A change in RF power absorption by the object may be indicative of a change of volume of the object, referred to herein as a volume change. When the volume of the object increases, the RF power absorption respectively increases and vice versa. As an indication to volume change is based on detecting changes in RF power absorbed by object 15, volume changes may be followed without measuring the temperature, the physical volume, the weight, the size, and/or the shape of object 15.

Optionally, volume change estimation can be used to define a set of instructions, values and/or ranges for adjusting parameters of the energy delivery to the zone in accordance with a certain volume change. Examples of parameters that may be adjusted include: the power and duration at which power is delivered at each MSE (e.g., at each frequency), a band of frequencies to be used, sub-portion of a working frequency band, one or more configuration of the radiating elements, an intensity of the RF energy etc.

Optionally, a change in the monitored variable may be used for estimating changes in a property of the object, and the estimated property change may be used to define energy delivery parameters. For example, volume change estimation may be used to define a set of instructions, values and/or ranges for adjusting parameters of the energy application (delivery) to the zone in accordance with a certain volume change.

As shown at 204, one or more parameters of the RF energy application may be adjusted (e.g., automatically) based on changes in the monitored variable (e.g., based on the rate of RF energy absorption). In such a manner, proofing, rising, and/or heating processes may be controlled in real time according to the rate of RF energy absorption or other monitored variable. The change in the RF energy absorption may be indicative of a volume change. The adjusted parameters may include, for instance, an EM field intensity, phase, and frequency of the applied RF energy, and a power difference between two or more radiating elements used together to excite a field pattern in the energy application zone, EM energy distribution in the energy application zone, and/or boundary conditions imposed on the electromagnetic field in the energy application zone.

According to some embodiments of the present invention the RF energy is applied in a number of different MSEs (e.g., at a plurality of frequencies), for example as described in some or all of the patent applications included Table 1. In such embodiments, parameters of the RF energy application in one or more of the MSEs (e.g., frequencies) may be adjusted, simultaneously with and/or separately from the RF energy which is delivered in some or all of the other frequencies and/or MSE's.

As shown by arrow 205, the process depicted in steps 201, 202, and 204 may be iterative, allowing the adjustment of RF energy applied for heating, thawing, cooking, browning, proofing, rising, and/or otherwise processing object 15 in real time. As used herein, adjusting RF energy in real time means adjusting RF energy during a processing of the heated object, for example while the temperature of the object is increased, decreased and/or maintained stable. For example, the processing may include periods, intermissions in RF energy application. For example, processing may include delivery of RF energy, stoppage of RF energy delivery for a period, and later on, for example, when the object cools, restart of RF energy delivery.

Optionally, the RF energy, for example the intensity thereof, is reduced, increased, nullified, and/or maximized according to the time derivative of RF power absorption and/or according to changes in the time derivative of RF power absorption. Different rates of RF power absorption changes may induce different adjustments as they are indicative of different changes in the object, for example, different volume changes.

Optionally, the adjustment may include ending the heating process according to a change in the power absorption. For example, a heating process for baking bread by heating yeast dough, may be ended after the rate of RF energy absorption reflects an object with a stable volume for the duration of a certain period, for example 30, 60, 120, or 300 s. Such stable energy absorption rate may indicate that the volume of the object remains unchanged or at least does not increase significantly. In some embodiments, heating may result in losing water by evaporation. The water content may influence the energy absorbability of the object, since usually water is the best RF absorber in a dough. Thus, in some embodiments, after a final volume is achieved heating continues until, for example, a drop in absorbability (for example, decrease in the absorbed power) is detected.

Optionally, the adjustment may include ending the heating process according to the energy delivery, for example, according to the amount of energy delivered to the energy application zone after the change in the monitored parameter was identified. For example, in certain embodiments, the energy absorbed by the object may be measured during a first phase of the heating, during which the rate of energy absorption increases constantly, for example, due to increase in object volume. When this stage ends, and the rate of energy absorption remains substantially constant, (e.g., optionally because the volume stopped increasing), a second heating phase may begin. In some embodiments, heating may be stopped when the energy absorbed by the object in the second phase is between about 30% and about 100%, for example, about 50%, of the energy absorbed by the object in the first phase. Optionally, the second phase heating may be stopped when another change in the time development of a monitored parameter is identified.

It should be noted that some changes in the rate of RF energy absorption may be an outcome of other effects (e.g., noise, and the modus operandi of the heating device (e.g., apparatus 100). For example, the object may adsorb energy more efficiently when oriented in the energy application zone in certain orientations than in others. Therefore, in embodiments where object 15 rotates in the energy application zone 13, power may be adsorbed more efficiently at some portions of the rotation than at others. In some embodiments, when discussing an increase or decrease of the absorbed power, the discussed increase or decrease may be in addition to such other effects.

In some embodiments, the RF energy, for example the intensity thereof, may be reduced to stop or slow down the volume increment of object 15 while keep heating, for example cooking, the object. In such a manner, dielectric heating may be used for processing the object without over increasing its volume. This may be used, for example, when crème brûlée is cooked: crème brûlée should not rise, and when such desserts are cooked, it may be useful to stop or substantially decrease the heating when an increase in the absorbed power is detected.

Optionally, the RF energy, for example the intensity thereof, may be reduced and/or stopped when the rate of RF energy absorption of the object exceeds a predetermined threshold, for example more than 50% or more than 100% or more than 200% from the initial rate of RF energy absorption, or at a predefined pace, for example at more than 1% per 1 second.

Figure 9:
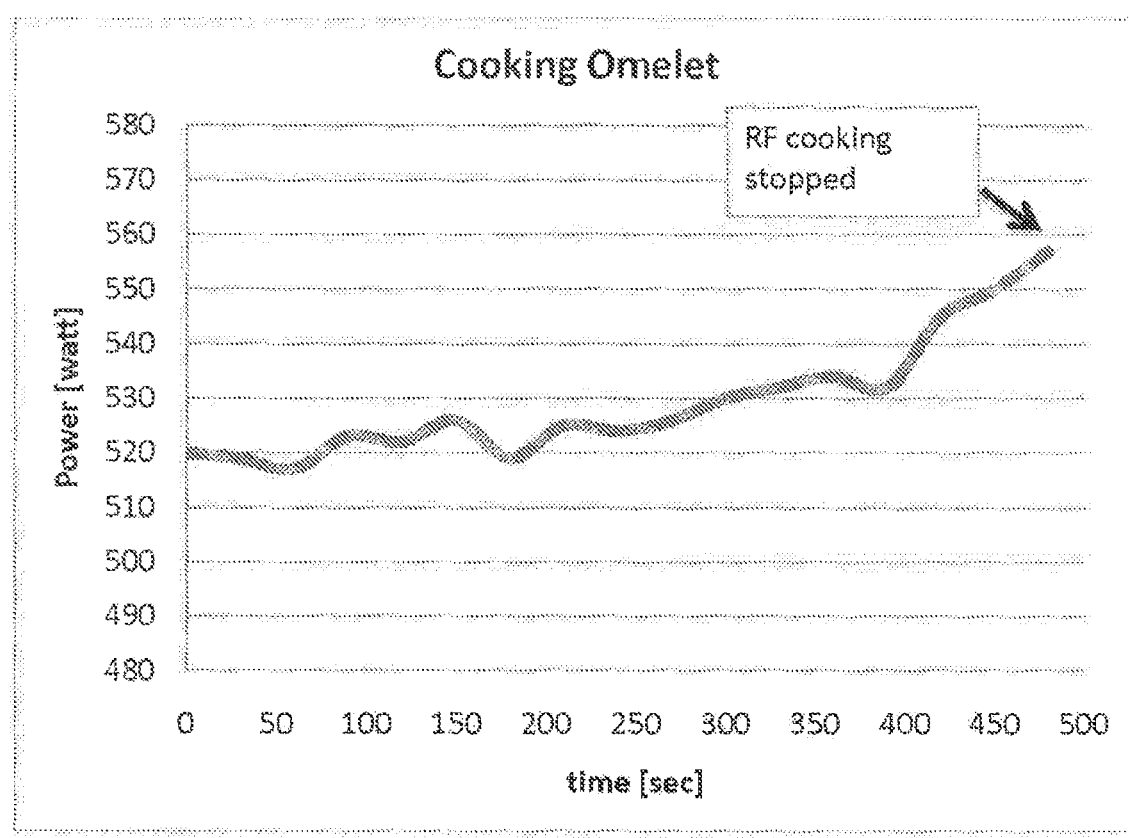
FIG. 9 is a graphical representation of power absorbed in an omelet cooked in an RF oven.

In some embodiments, the RF energy may be adjusted when the time derivative of the absorbed power changes, for example, from moderate raising to more rapid raising, as exemplified in FIG. 9, discussed below.

Optionally, the RF energy application may be halt and/or the intensity of the RF energy may be changed, for example reduced or increased, when the rate of RF energy absorption indicates that a predetermined physical or chemical change took place, for instance, that the volume of object 15 increases or collapses to a predetermined size. Alternatively or additionally, the RF intensity may be changed, when a physical or chemical process has progressed to a predetermined degree, for example when the volume change of predefined percentage relatively to the initial volume of said at least one object occurred, and/or when a predetermined change in a previously measured rate of RF energy absorption is detected.

According to some embodiments of the present invention, method 200 may be used for baking and/or rising food objects, for example dough pieces and/or other food objects that increase in volume during the heating thereof, for example pastries such as sponge cake, chocolate cakes, soufflé, and/or yeast dough-based products. In such embodiments, increase in the rate of RF energy absorption may result from a rising pace of the object during a baking process induced by the heating. According to some embodiments of the present invention, method 200 may be used for thawing meat, pizzas, or other food stuffs. The present invention is not limited, however, to the processing of foodstuffs, and may be used for controlling RF application to any kind of object that may go physical or chemical change that may be reflected in changes in the absorption, absorption rate, or time derivative of the absorption rate of the processed object.

It should be noted that in some embodiment, (e.g., baking bread or sponge cakes), rising is advantageous, and the control may allow maximal rising of the food product. In some embodiments, for example baking some cheesecakes or preparing Crème brûlée rising is unwanted, and energy application may be cut off or reduced when rising is detected by detecting increase in absorbed power. Alternatively or additionally, RF energy application may be ceased or decreased when rising in a pace above a specified rising pace is detected, by, for example, detection of increase in the absorbed power in a pace above a specified pace.

In some embodiments, a food object may be placed in energy application zone 13 and heated by applying RF energy. When a certain food object, such as a cheese cake, increase in volume, optionally in a rate and/or amount above a certain threshold, the intensity of the applied power may be reduced, optionally to null.

In another example, the heating process may be stopped when the increase in RF power absorption is below a certain threshold. In such an embodiment, food objects are heated only as long as the monitored absorbed RF power is indicative of a volume increase rate below some threshold.

Optionally, only part of a heating process is adjusted according to rates of RF energy absorption. For example, in heating objects from frozen state to a temperature well above the melting point (for example, when baking bread from frozen dough), the adjustment may be performed only after the object is thawed and/or after a certain heating period. Optionally, the adjustment may be performed after the temperature of the object is above a certain threshold and/or within a certain range. In some embodiments, there may be several different control regimes, and different changes in energy applications may correspond to similar changes in absorbed power. For instance, during thawing, the intensity of the RF energy may be decreased when an increase in absorbed power is detected, since an increase in absorbed power in the thawing stage may indicate water formation. In a later baking stage, however, intensity of the RF energy may be decreased when a decrease in absorbed power is detected, since such decrease may be indicative of water loss, which may happen after puffing ends.

To identify different regimes, or for other purposes, the processing device may include a temperature sensor. Such a temperature sensor may provide the current temperature of object 15 during the heating process. Optionally, the temperature sensor may comprise a sensor, for example an infrared temperature sensor, such as the OS101 Series Miniature Low-Cost Non-Contact Infrared Temperature Sensor/Transmitter from NEWPORT and an infrared temperature sensor such as the OS136 Series Miniature Low-Cost Non-Contact Infrared Temperature Sensor/Transmitter from OMEGA Engineering. Alternatively or additionally, the processing device may include other sensors, for example, humidity sensors, or any other sensor which may be useful in determining borders between different control regimes.

Figure 6:
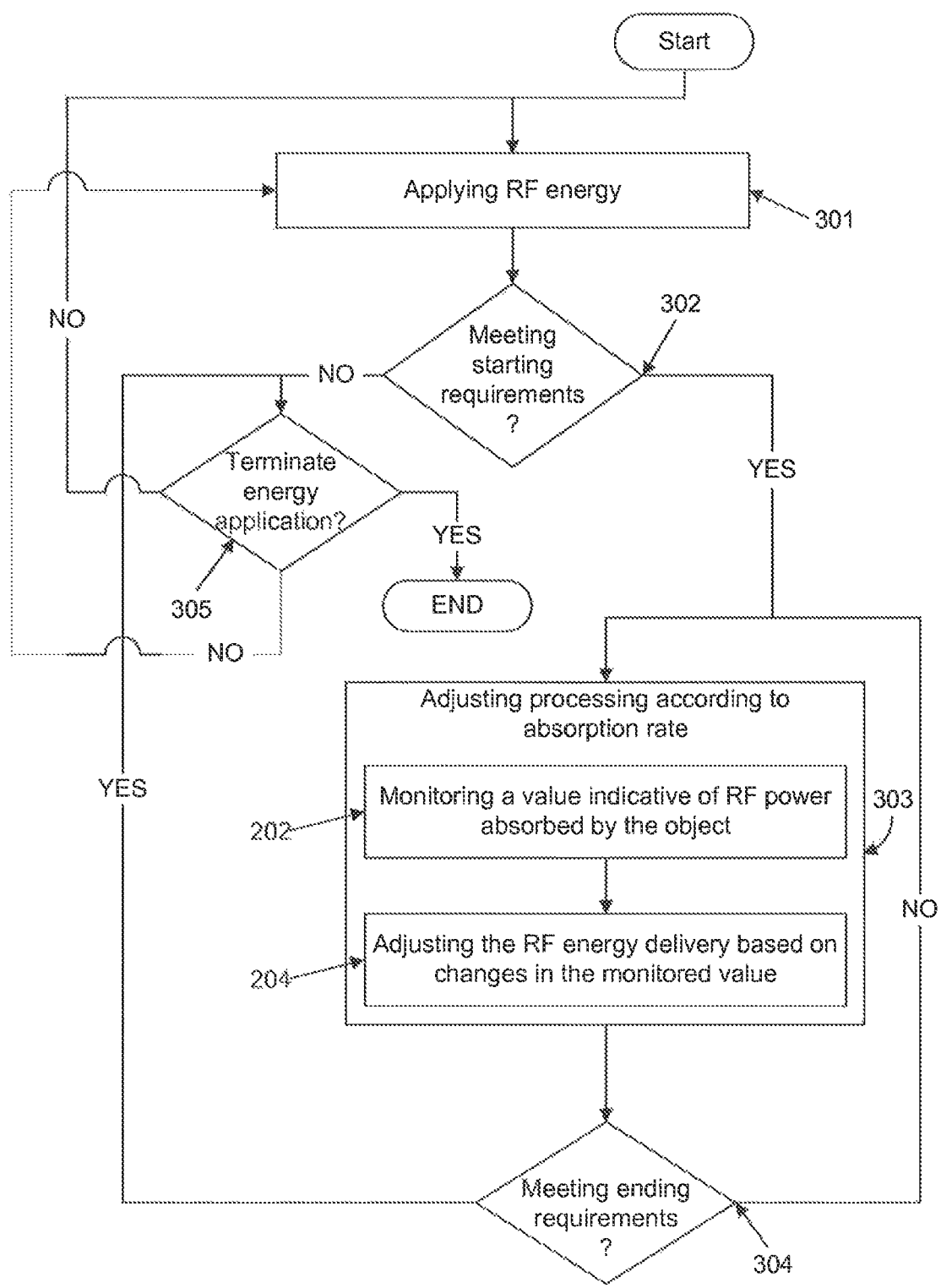
FIG. 6 is a flowchart of a method of adjusting phase in a multi phase heating process, according to some embodiments of the present invention.

Reference is now made to FIG. 6, which is a flowchart of a method of adjusting a heating phase in a multi phase heating process, according to some embodiments of the present invention. It should be noted that in such a multi phase heating process, in some, but not necessarily in all of the phases, the energy delivery may be controlled by changes in the monitored variable, for example, in the power absorption and/or its time derivative.

First, as shown at 301 (similarly to 201 of FIG. 5), the object, which may be a food object, may be processed, for example thawed, heated, cooked, baked, and/or otherwise processed by applying RF energy.

Now, as shown at 302, starting requirement(s) may be tested. If the requirements are met (302: YES), the process may enter an adjustment phase, in which energy application may be adjusted in accordance with changes in the monitored variable, for example, power absorption rate, as shown in 303; otherwise (302: NO), termination of energy application may be considered (as shown in step 305), and if not accepted (305: NO), energy application may continue as in 301. If termination is accepted (305: YES), the process may end. Criteria for terminating the processing may include, for example, a period of time that lapsed after the adjustment phase ended, amount of energy absorbed in the object after the adjustment phase ended.

The requirements tested at 302 may be used as conditions for entering an energy application adjustment phase. The requirements may include a threshold that defines a minimum temperature level of the heated object, a threshold that defines a minimum time that has elapsed since the heating process has been initiated, and/or other conditions.

In some embodiments, processing may include thawing. Optionally, thawing may be carried out without adjustment, and the requirements to be met in step 302 may include an indication for the end of the thawing process. Alternatively or additionally, the extent to which the object is close to thawing may be used as a requirement. In such embodiments, the adjustment is optionally initiated only after the object is thawed. Optionally, the thawing is determined as described in '538.

In some embodiments, adjustment may be used also during thawing. In some embodiments, however, the adjustments made during thawing may be different than those made during cooking.

Now, as shown at 303, the object may be processed according to a monitored variable, for instance, a rate of absorption, for example as described above in relation to 202 and 204 of FIG. 5. This phase may be referred to herein as a property adjusted, for example, volume adjusted (or absorption adjusted) heating phase or process, or, more generally, adjustment phase.

As shown at 304, the adjustment phase may last as long as some ending requirements are not met (if 304: NO—the method returns to step 303). For example, the ending requirements may include a threshold to the rate of RF power absorption, a threshold temperature, and/or threshold or desired ranges for other characteristics of the object.

For example, in some embodiments, the adjustment phase may last until the cumulative increase in absorption rate indicates a volume increase of at least 30%.

As shown at 305, in some embodiments, the processing may proceed after the adjustment period has ended (if 304: YES, termination of the heating process may be considered at 305, and if not terminated (305: NO) energy application may continue at 301. Such further processing may be active until a third requirement is met. For example, after adjustment phase ends, the object may be further heated for a certain period, for example two minutes, using RF energy and/or other heating and/or until a predefined amount of RF energy is absorbed in the object, for example 5 KJ per 100 g of an object. In some embodiments, the predefined amount of RF energy is adsorbed only in the post-adjustment phase. In some embodiments, heating may continue after a first adjustment phase ends, and another absorption adjusted phase may begin. Thus if conditions for heating termination are not fulfilled (305: NO), energy application may continue (301), and meeting starting requirement of another absorption adjusted rate may be checked in 302. If such requirements are met (302: YES), another adjustment phase may begin (303).

The method depicted in FIG. 6 may allow using apparatus 100 for baking a dough based product, for example yeast dough, in a multi phase process that may include adjustment phases and non adjusted phases. The adjustment phase may be executed after the dough based product is thawed and optionally heated to a minimum temperature and before browning is completed and/or initiated.

It should be noted that the processes depicted in FIGS. 5 and 6 may be iterative. An object may be heated in a multiple phase process that includes a number of adjustment phases, optionally non consecutive.

Adjusting the heating process according to parameters or variables indicative of volume changes (e.g., in absorbed power), may allow avoiding undesired physical or chemical changes, for example, avoiding undesired volume increment of dough based products and cakes (e.g., New York Cheesecake).

In some embodiments, to prevent power absorption to go beyond some limit, a top limit may be applied on the power of the applied RF energy and/or the heating may be adjusted such that the rate of increase in power is below a given threshold (e.g., null).

Various embodiments and aspects of the present invention as delineated hereinabove and as claimed in the claims section below find experimental support in the description as a whole including the following examples.

EXAMPLES

Reference is now made to the following examples, which illustrate some embodiments of the invention in a non limiting fashion.

In the first example, white braided bread was baked in an RF oven controlled in accordance with an embodiment of the present invention. The air temperature around the bread was set to 150° C. The bread weighed 495 g before baking, and 470 g after baking. It is believed that the weight change was due to water evaporation.

The oven had two antennas, and provided energy uniformly, essentially as described in '723. During baking the bread was rotated in the energy application zone on a rotating plate, at a rate of 0.5 RPM.

Two optical fiber based temperature sensors were inserted into the bread in two different places. One sensor was inserted in the middle-TC2 and the other in a side part-TC1 of the bread. Their output, as well as the power dissipated into the bread were monitored. Every two minutes the rotation direction of the plate was changed (from clockwise to anti clockwise and vice versa), to prevent entanglement of the temperature sensors. The results are shown in FIG. 7A.

Figure 7A:
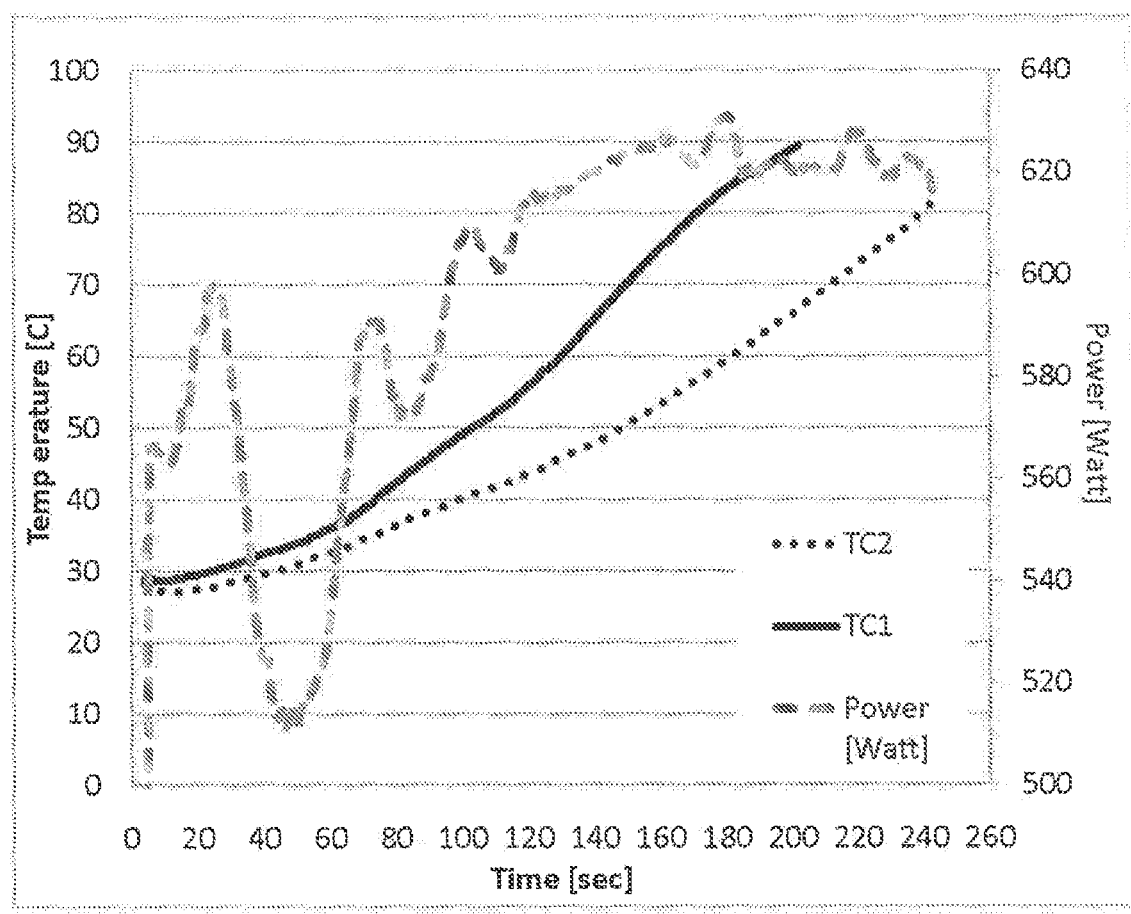
FIG. 7A is a graphical representation of power absorbed in a bread that was baked in an RF oven, and temperature measured during baking at two locations in the bread.

As shown in FIG. 7A, the absorbed power (dashed line) mostly grew during a first phase of energy application (from t=0 s to about t=160 s), and then remained constant, without significant change. The total energy absorbed by the bread in the first phase (from t=0 s to t=160 s) was about 93 KJ, and at the end of cooking, it was 167 KJ. Thus, the energy absorbed by the bread after volume stabilization was about 80% of the energy absorbed during the rising stage, and about 40% of the overall energy absorbed.

The temperature inside the bread was developing quite steadily during both phases. The side temperature sensor (TC1) detached from the bread at about 185 s.

When heating ended, the bread was ready, and the inside temperature was measured to be 96° C., using a thermometer having an accuracy of ±0.5° C. It is noted that the optical fiber based temperature sensors are more trusted for temperature changes than for absolute temperature, and are believed to provide a realistic view of the temperature development (e.g., time derivative) inside the bread.

Figure 7B:
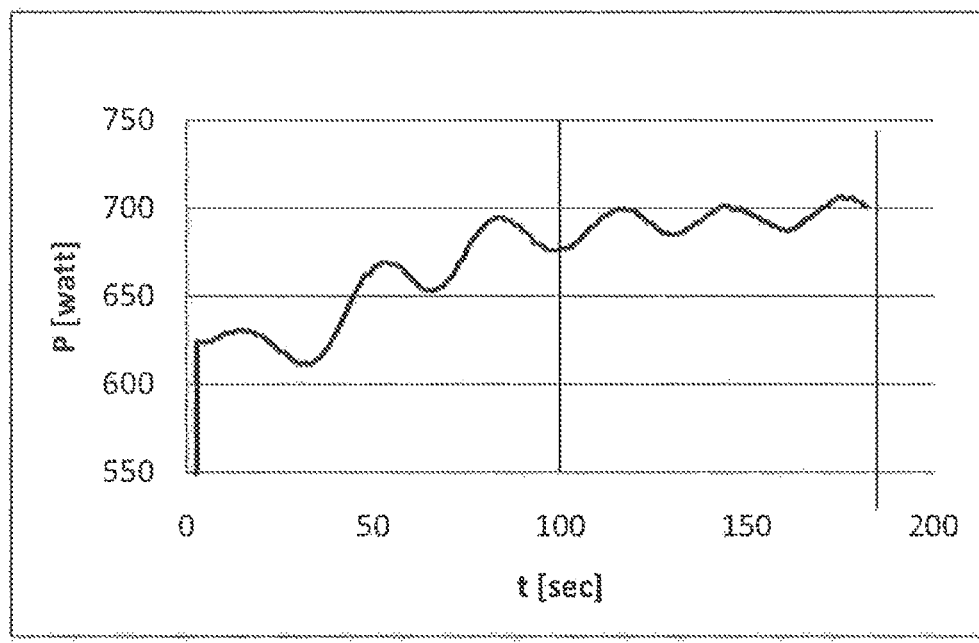
FIG. 7B is a graphical representation of power absorbed in an object that included three different loafs of bread baked in an RF oven.
Figure 7C:
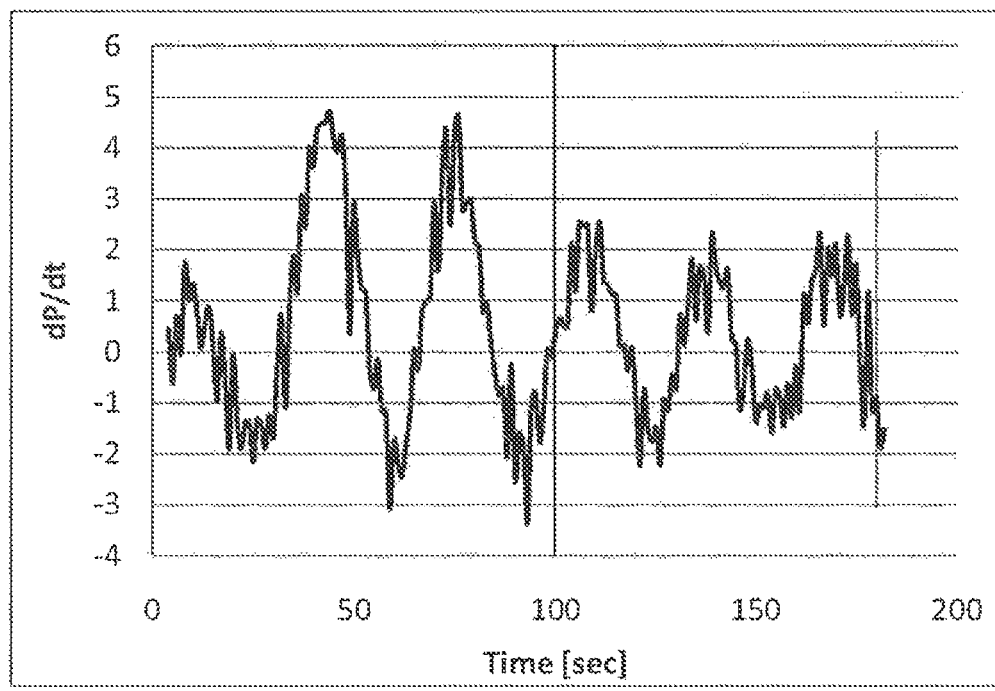
FIG. 7C is a graphical representation of a time derivative of the power absorbed illustrated in FIG. 7B.

FIG. 7B shows time development of the absorbed power during the baking of three bread loafs in the oven used in FIG. 7A. FIG. 7C shows a time derivative of the graph shown in FIG. 7B. Temperature was not measured in this experiment. As can be seen, absorbed power increased during the first 100 s or so (marked with a vertical line on both FIGS. 7B and 7C), and then stabilized, fluctuating. In FIG. 7C, it is shown that the time derivative of the absorbed power changes periodically, with a period of about 120 s, which becomes smaller in amplitude and longer in duration as the power absorption stabilizes. Without being bound to theory, the periodical changes having a period of about 30 s may be related to the cycle time of 0.5 RPM of the rotating plate in the RF oven, that causes the bread to move between a first orientation, where it is perpendicular to a line connecting the two antennas and a second position, where it is parallel to that line, four times a minute.

In a second example, a similar experiment was carried out with three loaves of bread, baked simultaneously in the oven used for example 1. The initial and final weights of the three loaves were as follows (with C1, C2, and C3 representing loaf Nos. 1, 2, and 3, respectively). Loaf 2 was placed between Nos. 1 and 3.

At t=0 s: C1=490 g; C2=510 g; and C3=515 g; and at the end of the cooking, C1=465 g; C2=500 g; and C3=490 g.

Figure 8:
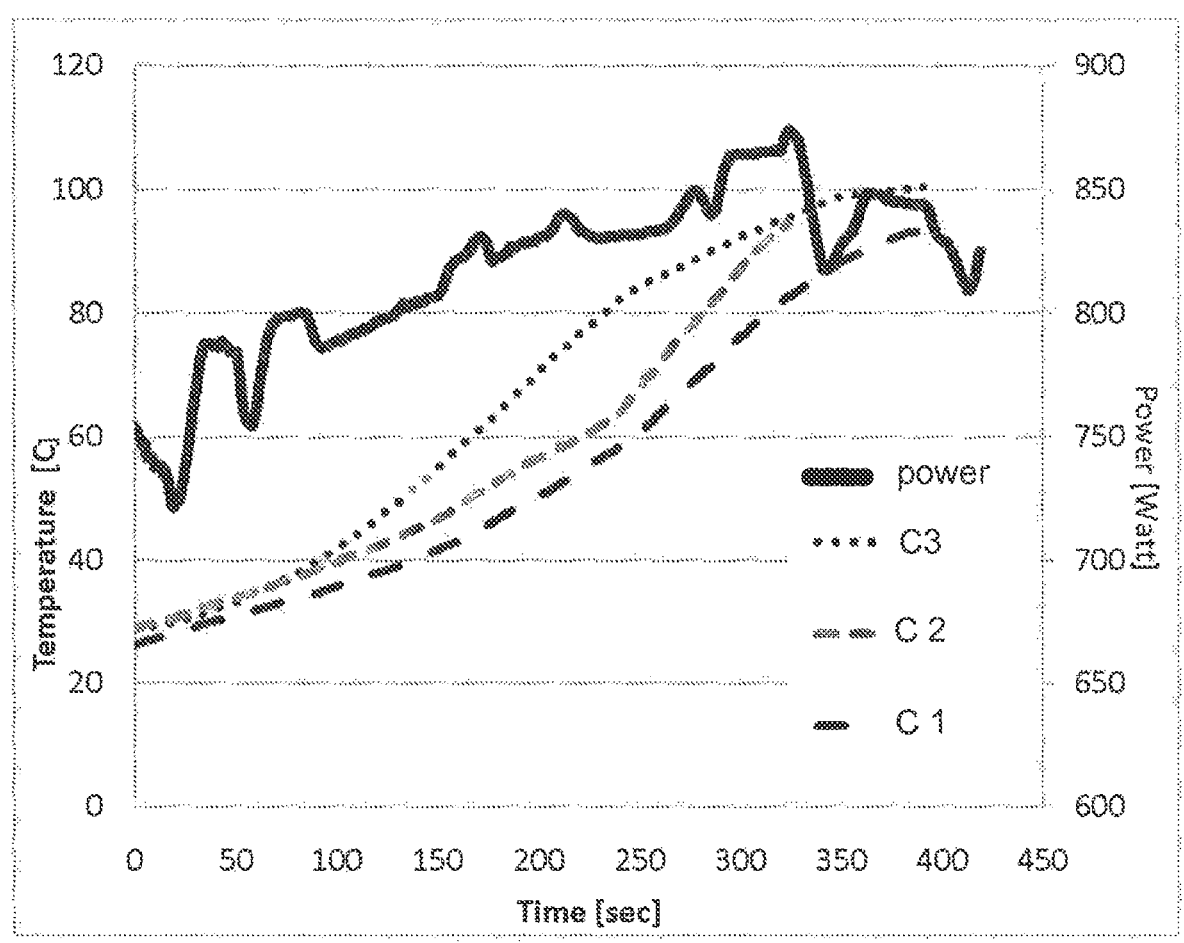
FIG. 8 is a graphical representation of power and temperature in three different breads baked simultaneously in an RF oven.

Power and temperature were monitored during cooking and the measured values are provided in FIG. 8. As seen in FIG. 8, the absorbed power increased significantly during the first 290 s or so, and then stabilized for additional 130 s. An amount of about 100 KJ were absorbed in the loaves during the last 130 s, which is equal to about 40% of the amount of energy absorbed by them during the first 290 s. The final temperatures inside each of the loaves were 89° C., 91° C., and 92° C. at the end of baking. From the graphs it is seen that the temperature in all the three loaves rose steadily for about the first 340 s, and then reached a plateau.

Near the end of the baking process, one may observe a beginning of a decrease in the absorbed power. Without being bound to theory, such decrease may be related to dehydration of the bread. Regardless of the validity of this explanation, such decrease may be used as stopping criteria, that is, in some embodiments, heating may be stopped when a non-transient decrease in the absorbed power is detected over time.

In a third example, a New York cheesecake was baked in an oven similar to that for examples 1 and 2. Whenever an increase was detected in absorbed power the power supply was cut off manually, and then renewed at a lower incident power. The resultant cake was well baked both at the edges and at the center and was flat throughout.

In a fourth example, a standard omelet was prepared from 12 eggs, which were scrambled and poured into a silica baking pan at room temperature (22° C.), and covered with adhesive plastic foil. The omelet was cooked in the oven of the first example. The air temperature inside the oven was 22° C. Following baking, the temperature of the omelet was 85° C., the coagulation temperature of eggs. The time development of the absorbed power is illustrated in FIG. 9. As can be seen in the figure, the absorbed power moderately increased from the beginning of the baking until a point, around 400 s afterwards, when power absorption increased dramatically, for about 110 s, after which the power was cut off and the final temperature measured. The omelet was flat and uniformly cooked through its entire volume. This may indicate that a sharp increase in absorbed energy may be a satisfactory termination criterion for cooking an omelet.

Figure 10:
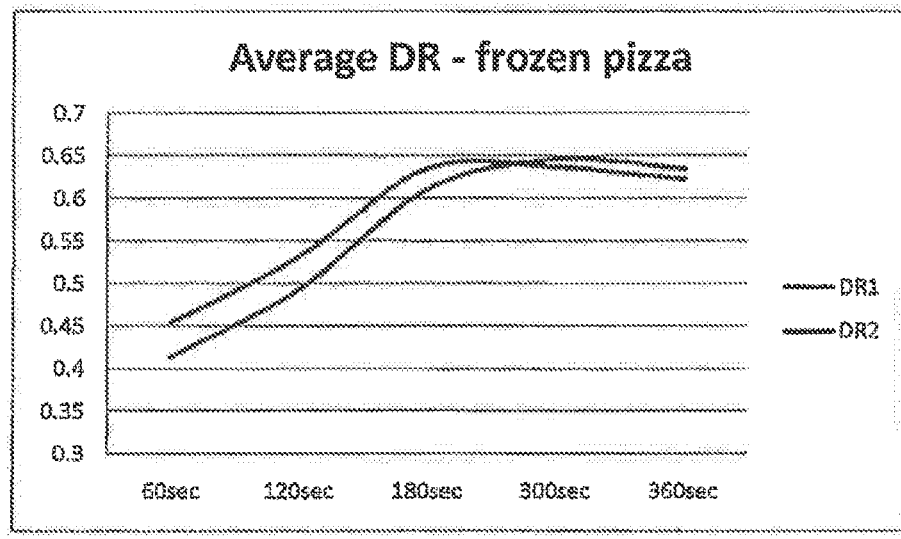
FIG. 10 is a graphical representation of time development of average dissipation ratio during defrosting of frozen pizzas.

In a fifth example, a frozen pizza was defrosted and cooked in an RF oven having two antennas and being operated as described in '723, but different from the oven used in the first example. The air temperature was 200° C., and the amount of RF energy absorbed by the pizza during the heating process was 73 Kj. The average dissipation ratio (DR) over the various frequency used (800 MHz-1000 MHz, with 0.5 MHz intervals) was monitored. The oven had a stationary tray for the pizza, so no artifacts due to rotation of a turntable were expected. The results are shown in FIG. 10. The average DR increased steadily, and then, at about 180 s from the beginning, stabilized and slightly decreased. The lines DR1 and DR2 show the average DR for each of the two radiating elements. At 360 s the pizza was ready for eating.

Figure 11:
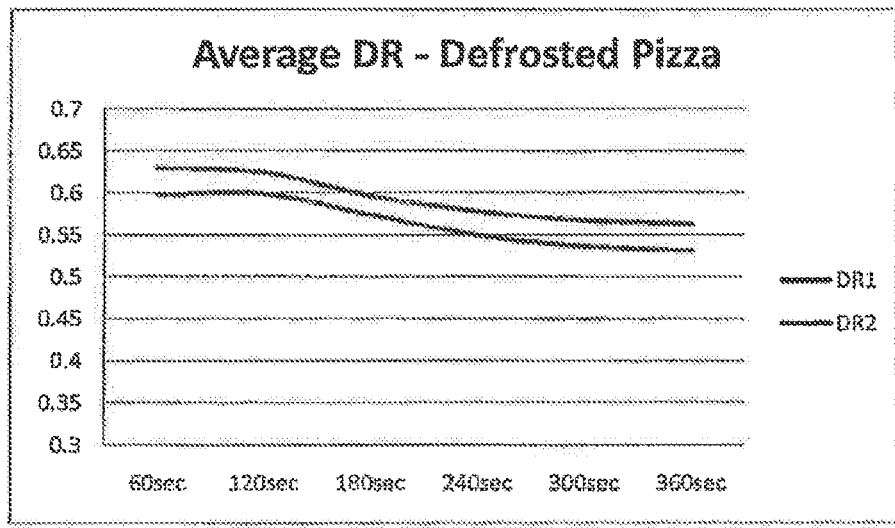
FIG. 11 is a graphical representation of time development of average dissipation ratio during cooking of a defrosted pizza.

In another experiment, a defrosted pizza, at about 10° C., was cooked in the same RF oven as in the preceding example, at air temperature of 200° C. The amount of RF energy that the pizza absorbed during the heating process was 78 KJ. The time development of the average DR is shown in FIG. 11. As shown in the figure, the time development of the average DR in the defrosted pizza shows a slight decrease similar to the decrease observed in FIG. 10, from 180 s forward. At the end, the pizza was ready for eating, but cooked to a greater degree than the pizza of FIG. 10.

In view of these results, in some embodiments, a frozen pizza may be defrosted using a defrosting protocol while the average DR monitored. When the average DR ceases to increase, the heating may be adjusted. For example, if only defrosting is desired, heating may be stopped. If cooking is also desired, cooking may continue, optionally at higher power (or heating may be otherwise adjusted for cooking of defrosted pizza).

As used herein, the singular form "a", "an" and "the" include plural references unless the context clearly dictates otherwise. The use of the terms "at least one", "one or more", or the like in some places is not to be construed as an indication to the reference to singular only in other places where singular form is used. In particular, throughout this specification, references are made to "object", "an object", or "the object" in singular. This term is used to refer to one or more objects, to an object comprising a plurality of objects, to a portion of an object, or the like.

The terms wattage and power may be used herein interchangeably.

The terms rate of energy absorption and absorbed power may be used herein interchangeably.

It is expected that during the life of a patent maturing from this application many relevant systems and methods will be developed and the scope of the terms dielectric heating unit, power supply, and feeds is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An apparatus for applying radio frequency (RF) energy in order to heat an object placed in a cavity, the apparatus comprising:
    a source configured to generate the radio frequency (RF) energy in order to heat the object;
    a measuring or detecting device configured to measure or detect an amount of power absorbed by the object during heating of the object or during a short hiatus in the heating of the object;
    an energy adjusting device; and
    at least one processor configured to:
        control the source of electromagnetic energy to apply radio frequency (RF) energy to the cavity in order to effect heating of the object in a controlled manner;
        receive from the measuring or detecting device at least one indicator of an average amount of absorbed power, averaged over a plurality of modulation space elements (MSEs), each MSE including a set of values of one or more parameters that affect a field pattern excited in the cavity, wherein the one or more parameters are controllable by the at least one processor;
        monitor via the measuring or detecting device the at least one indicator during application of the radio frequency (RF) energy; and
        adjust via the energy adjusting device the radio frequency (RF) energy application when the monitored at least one indicator indicates a predetermined change in a previously measured rate of the average amount of absorbed power averaged over the plurality of MSEs.

2. The apparatus of claim 1, wherein the one or more parameters comprise a frequency.

3. The apparatus of claim 1, wherein the one or more parameters comprise a phase.

4. The apparatus of claim 1, wherein the at least one processor is configured to:

determine an amount of absorbed power at each of the plurality of MSEs as a difference between input power applied to the cavity by one or more feeds and power received by at least a subset of the one or more feeds at that MSE.

5. The apparatus of claim 4, wherein the at least one processor is configured to:
determine the average amount of absorbed power by averaging the determined amount of absorbed power at each MSE across the plurality of MSEs.

6. The apparatus of claim 1, wherein the predetermined change includes a change in time development.

7. The apparatus of claim 1, wherein the cavity is arranged inside a microwave heating apparatus.

8. The apparatus of claim 1, wherein the source is coupled to at least one antenna.

9. The apparatus of claim 1, wherein the measuring or detecting device is a detector configured to receive the radio frequency (RF) energy from the cavity through one or more antennas, wherein the one or more antennas are configured to deliver the radio frequency (RF) energy to the cavity to process the object.

10. The apparatus of claim 1, wherein the energy adjusting device is an amplifier.

11. The apparatus of claim 1, wherein the measuring or detecting device is a detector.

* * * * *